United States Patent
Fu

(10) Patent No.: US 12,262,267 B2
(45) Date of Patent: Mar. 25, 2025

(54) CELL MEASUREMENT METHOD AND APPARATUS, AND DEVICE AND STORAGE MEDIUM

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 392 days.

(21) Appl. No.: 17/659,910

(22) Filed: Apr. 20, 2022

(65) Prior Publication Data

US 2022/0248282 A1    Aug. 4, 2022

Related U.S. Application Data

(63) Continuation of application No. PCT/CN2019/115114, filed on Nov. 1, 2019.

(51) Int. Cl.
*H04W 56/00*    (2009.01)
*H04L 27/26*    (2006.01)
(Continued)

(52) U.S. Cl.
CPC ..... *H04W 36/0088* (2013.01); *H04L 27/2657* (2013.01); *H04W 24/02* (2013.01);
(Continued)

(58) Field of Classification Search
CPC ... H04W 36/008; H04W 24/02; H04W 48/16; H04W 56/001; H04W 56/0055;
(Continued)

(56) References Cited

U.S. PATENT DOCUMENTS

2019/0069228 A1    2/2019  Malik et al.
2019/0363809 A1*   11/2019 Yoon ................... H04W 56/001
(Continued)

FOREIGN PATENT DOCUMENTS

CN    109075940 A    12/2018
CN    109151922 A     1/2019
(Continued)

OTHER PUBLICATIONS

English Machine Translation of WO 2020/088597. (Year: 2024).*
(Continued)

*Primary Examiner* — Peter P Chau
(74) *Attorney, Agent, or Firm* — PERKINS COIE LLP

(57) ABSTRACT

The present disclosure provides a cell measurement method and apparatus, and a device and a storage medium. The method includes: receiving a first measurement configuration, the first measurement configuration including a frequency point to be measured, first configuration information of a first measurement window corresponding to said frequency point, and a whitelist neighbors list, as well as a first starting time offset corresponding to neighbor cells in the whitelist neighbors list; determining a synchronizing signal block (SSB) receiving window corresponding to the neighbor cells in the whitelist neighbors list according to the first configuration information of the first measurement window corresponding to said frequency point and the first starting time offset corresponding to the neighbor cells in the whitelist neighbors list; and measuring each neighbor cell in the whitelist neighbors list based on the SSB receiving window corresponding to the neighbor cells in the whitelist neighbors list.

20 Claims, 8 Drawing Sheets

Receive a first measurement configuration, the first measurement configuration includes a frequency point to be measured, first configuration information of a first measurement window corresponding to the frequency point to be measured, and a whitelist neighbors list, as well as a first starting time offset corresponding to a neighboring cell in the whitelist neighbors list — 201

Determine a Synchronizing Signal Block (SSB) receiving window corresponding to a neighboring cell in the whitelist neighbors list according to the first configuration information of the first measurement window corresponding to the frequency point to be measured and a first starting time offset corresponding to the neighboring cell in the whitelist neighbors list — 202

Measure each neighboring cell in the whitelist neighbors list based on an SSB receiving window corresponding to the neighboring cell in the whitelist neighbors list — 203

(51) Int. Cl.
   *H04W 24/02*   (2009.01)
   *H04W 36/00*   (2009.01)
   *H04W 48/16*   (2009.01)

(52) U.S. Cl.
   CPC ......... *H04W 48/16* (2013.01); *H04W 56/001* (2013.01); *H04W 56/0055* (2013.01)

(58) Field of Classification Search
   CPC .............. H04W 36/0094; H04W 84/06; H04L 27/2657; H04B 7/18563; Y02D 30/70
   See application file for complete search history.

(56) References Cited

U.S. PATENT DOCUMENTS

| | | | | |
|---|---|---|---|---|
| 2020/0374735 | A1* | 11/2020 | Wei ........................ | H04L 5/0091 |
| 2021/0029566 | A1* | 1/2021 | Li .......................... | H04W 24/08 |
| 2021/0037403 | A1* | 2/2021 | Kim ................... | H04W 56/001 |
| 2022/0167290 | A1* | 5/2022 | Harada ................. | H04L 5/0048 |
| 2022/0279427 | A1* | 9/2022 | Hwang ................. | H04W 48/16 |

FOREIGN PATENT DOCUMENTS

| | | | |
|---|---|---|---|
| EP | 3614737 A1 | 2/2020 | |
| WO | WO-2020088597 A1 * | 5/2020 | ............ H04W 24/10 |

OTHER PUBLICATIONS

RAN4#90bis Meeting report—3GPP Draft; draft_RAN4#90bis_meeting report_vl, Apr. 23, 2019 (Apr. 23, 2019) (828 pages).

International Search Report issued Jul. 21, 2020 of PCT/CN2019/115114 (4 pages).

Ericsson "Cell selection and reselection criteria and measurement configuration" Tdoc R2-1712343; 3GPP TSG-RAN WG2 #100; Reno, Nevada; Nov. 27-Dec. 1, 2017. 4 pages.

Extended European Search Report for European Application No. 19950736.9 issued Oct. 17, 2022. 10 pages.

ZTE "RRM Measurements on IDLE mode RS" R1-1707050; 3GPP TSG RAN WG1 Meeting #89; Hangzhou, P.R. China; May 15-19, 2017. 8 pages.

\* cited by examiner

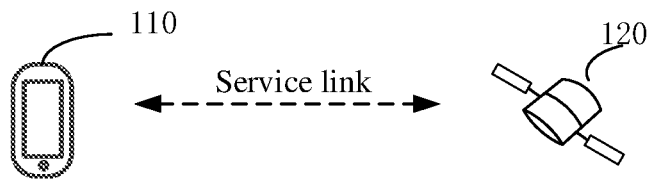

FIG. 1

| Receive a first measurement configuration, the first measurement configuration includes a frequency point to be measured, first configuration information of a first measurement window corresponding to the frequency point to be measured, and a whitelist neighbors list, as well as a first starting time offset corresponding to a neighboring cell in the whitelist neighbors list | 201 |

↓

| Determine a Synchronizing Signal Block (SSB) receiving window corresponding to a neighboring cell in the whitelist neighbors list according to the first configuration information of the first measurement window corresponding to the frequency point to be measured and a first starting time offset corresponding to the neighboring cell in the whitelist neighbors list | 202 |

↓

| Measure each neighboring cell in the whitelist neighbors list based on an SSB receiving window corresponding to the neighboring cell in the whitelist neighbors list | 203 |

FIG. 2

CELL MEASUREMENT METHOD AND APPARATUS, AND DEVICE AND STORAGE MEDIUM

CROSS-REFERENCE TO RELATED APPLICATION

The present application is a continuation application of International PCT Application No. PCT/CN2019/115114, filed on Nov. 1, 2019, the entire content of which is hereby incorporated by reference.

TECHNICAL FIELD

The present disclosure relates to the field of communication technologies, in particular to a cell measurement method, a cell measurement apparatus, a device, and a storage medium.

BACKGROUND

Non Terrestrial Network (NTN) technology generally provides communication services to terrestrial users by means of satellite communication, which has the advantages such as wide coverage and being free from user region restriction. According to different orbital heights, satellites can be categorized into Geostationary Earth Orbit (GEO), Low-Earth Orbit (LEO) and so on.

In some cases, User Equipment (UE) is required for performing cell measurement. Specifically, the satellite sends a measurement configuration to the UE, wherein the measurement configuration includes information such as a frequency point to be measured and its corresponding whitelist cell list. According to the measurement configuration, a UE performs cell measurement by receiving a Synchronization Signal Block (SSB) sent by each cell in the whitelist cell list. In practice, since there is a difference between a signal transmission delay between the UE and a current serving cell and a signal transmission delay between the UE and a neighboring cell. In a conventional terrestrial cellular system, in order to compensate this difference, corresponding SMTC (Synchronization Signal (SS)/Physical Broadcast Channel (PBCH) block measurement timing configuration) windows may be configured for different frequency points through measurement configuration, so that the UE can receive SSBs of different cells within the SMTC window.

However, in an NTN scene, due to large coverage of satellites, there is a large difference in signal transmission delays between a UE and different cells. If compensation is made according to the above method, duration of SMTC window needs to be greatly prolonged, which causes the UE to continuously try to receive SSBs in a long SMTC window, thereby increasing the power consumption of UE.

SUMMARY

Implementations of the present disclosure provide a cell measurement method, apparatus, and a device and a storage medium, which can be used to solve the problem of increasing power consumption of UE in related arts. Technical solutions are as follows.

In one aspect, a cell measurement method is provided, which is applied to a User Equipment (UE), including:
  receiving a first measurement configuration, wherein the first measurement configuration includes a frequency point to be measured, first configuration information of a first measurement window corresponding to the frequency point to be measured, and a whitelist neighboring cell list, as well as a first starting time offset corresponding to a neighboring cell in the whitelist neighboring cell list;
  determining a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list; and
  measuring each neighboring cell in the whitelist neighboring cell list based on the SSB receiving window corresponding to the neighboring cell in the whitelist neighboring cell list.

In another aspect, a cell measurement method is provided, which is applied to a User Equipment (UE), including:
  receiving a second measurement configuration including a frequency point to be measured, a whitelist neighboring cell list corresponding to the frequency point to be measured and first configuration information of a first measurement window;
  determining a first starting time offset corresponding to a neighboring cell in the whitelist neighboring cell list;
  determining a Synchronization Signal Block (SSB) receiving window corresponding to the neighboring cells in the whitelist neighboring cell list according to the first configuration information of the first measurement window corresponding to the frequency point to be measured and the first starting time offset corresponding to the neighboring cell in the whitelist neighboring cell list; and
  measuring each neighboring cell in the whitelist neighboring cell list based on the SSB receiving window corresponding to the neighboring cell in the whitelist neighboring cell list.

In another aspect, a cell measurement apparatus is provided, which is applied to a User Equipment (UE), including:
  a first reception module configured to receive a first measurement configuration, wherein the first measurement configuration includes a frequency point to be measured, first configuration information of a first measurement window corresponding to the frequency point to be measured, and a whitelist neighboring cell list, as well as a first starting time offset corresponding to a neighboring cell in the whitelist neighboring cell list;
  a first determination module configured to determine a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list; and
  a first measurement module configured to measure each neighboring cell in the whitelist neighboring cell list based on the SSB receiving window corresponding to the neighboring cell in the whitelist neighboring cell list.

In fourth aspect, a cell measurement apparatus is provided, which is applied to a User Equipment (UE), including:

a second reception module configured to receive a second measurement configuration including a frequency point to be measured, a whitelist neighboring cell list corresponding to the frequency point to be measured and first configuration information of a first measurement window;

a second determination module configured to determine a first starting time offset corresponding to a neighboring cell in the whitelist neighboring cell list;

a third determination module configured to determine a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list; and a second measurement module configured to measure each neighboring cell in the whitelist neighboring cell list based on the SSB receiving window corresponding to the neighboring cell in the whitelist neighboring cell list.

In a fifth aspect, a device is provided, which includes a processor and a memory, wherein at least one instruction is stored in the memory, and the at least one instruction is configured to be executed by the processor to implement the method provided in any of the above one aspect, or to implement the method provided in any of the above another aspects.

In a sixth aspect, a computer-readable storage medium is provided, which stores at least one instruction, and the at least one instruction is configured to be executed by a processor to implement the method provided in any of the above one aspect, or to implement the method provided in any of the above another aspects.

In a seventh aspect, a computer program product is provided, which includes one or more computer programs, which, when executed by a processor, are configured to implement the method provided in any of the above one aspect, or to implement the method provided in any of the above another aspects.

Beneficial effects brought by the technical solutions provided by the implementations of the present disclosure include at least following effects.

A first measurement configuration is received, wherein the first measurement configuration includes not only a frequency point to be measured, first configuration information of a first measurement window corresponding to the frequency point to be measured, and a whitelist neighboring cell list, but also a first starting time offset corresponding to a neighboring cell in the whitelist neighboring cell list; that is, the first starting time offset is also configured for the neighboring cell in the whitelist neighboring cell list. In this way, a Synchronization Signal Block (SSB) receiving window corresponding to the neighboring cell in the whitelist neighboring cell list may be determined according to the first configuration information of the first measurement window corresponding to the frequency point to be measured and the first starting time offset corresponding to the neighboring cell in the whitelist neighboring cell list, so that each neighboring cell in the whitelist neighboring cell list is measured based on the SSB receiving window corresponding to the neighboring cell in the whitelist neighboring cell list. Therefore, different first measurement windows can be determined for different neighboring cells. This ensures that a UE can receive SSBs of neighboring cells in the first measurement window, avoids the problem that the UE needs to continuously perform detection due to the need of delaying the window durations, and thereby saving power consumption of the terminal.

BRIEF DESCRIPTION OF DRAWINGS

In order to describe technical solutions in the implementations of the present disclosure more clearly, drawings that need to be used in the description of the implementations will be briefly introduced below. It is apparent that the drawings described below are only some implementations of the present disclosure, and for those of ordinary skills in the art, other drawings may be obtained according to these drawings without paying inventive efforts.

FIG. 1 is a schematic diagram of an implementation environment according to an exemplary implementation of the present disclosure.

FIG. 2 is a flowchart of a cell measurement method according to an exemplary implementation of the present disclosure.

DETAILED DESCRIPTION

Figure 3:
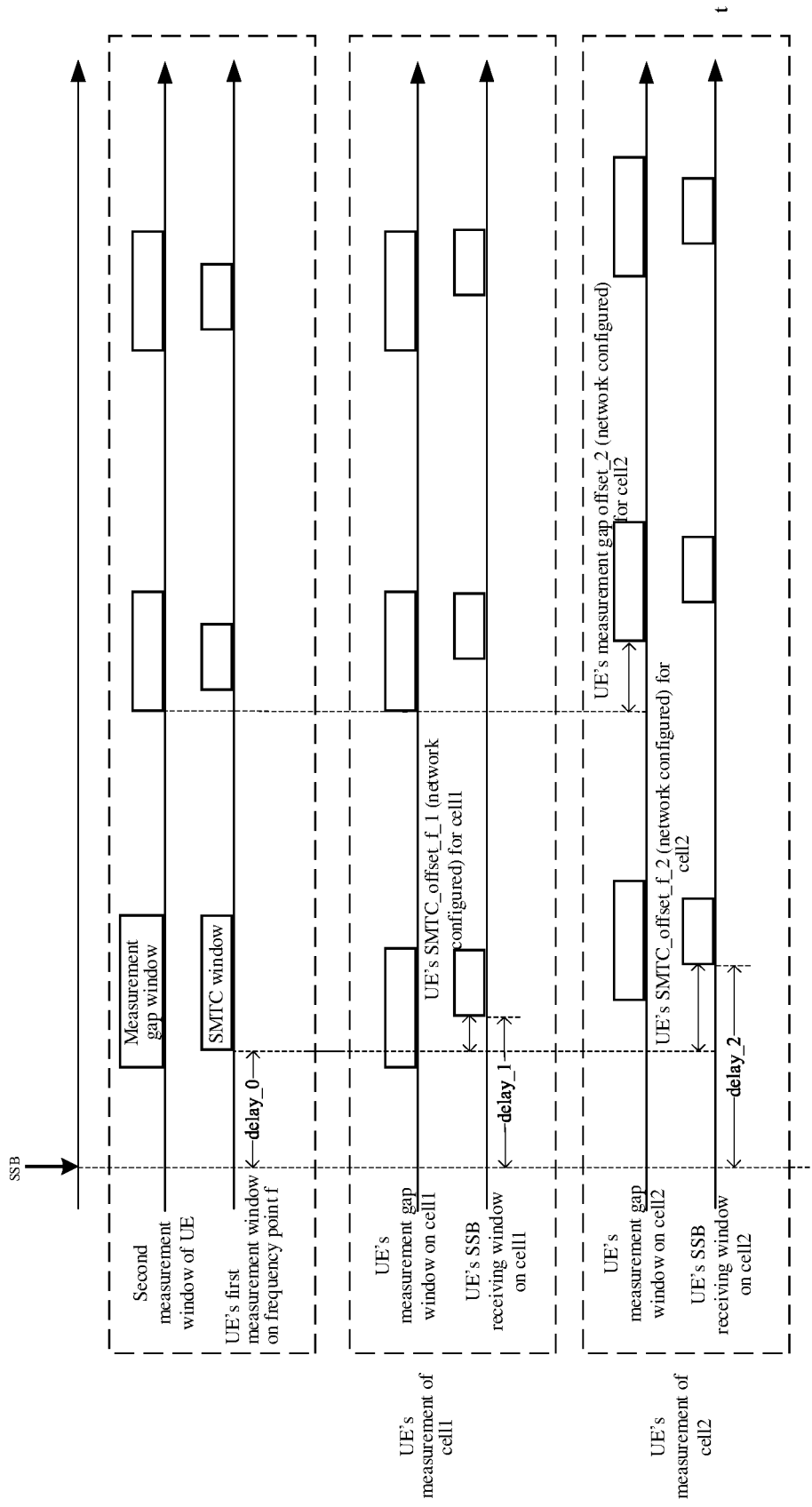
FIG. 3 is a schematic diagram of a measurement window according to an exemplary implementation of the present disclosure.

To make objects, technical solutions, and advantages of the present disclosure clearer, implementation modes of the present disclosure will be described in further detail below with reference to the drawings.

Before detailed description is made on a cell measurement method according to an implementation of the present disclosure, a brief introduction is made to related information, application scenarios, and implementation environments involved in the implementations of the present disclosure.

First, a brief introduction is made to the related information involved in the implementations of the present disclosure.

NTN technology: generally adopts satellite communication to provide communication services to terrestrial users. For satellite communication, because one satellite can cover a large area and orbit around the earth, theoretically, every corner on the earth can be covered by the satellite communication, that is, the satellite communication is not restricted by user's regions. For this reason, the satellite communication can remotely cover impoverished and underdeveloped countries or regions at low costs, thereby allowing users in these regions or countries to enjoy advanced voice communication and mobile Internet technology. In addition, the satellite communication further has advantages such as low costs and high stability, and is less susceptible to natural disasters.

According to an orbital height, communication satellites may be categorized into LEO satellites, Medium-Earth Orbit (MEO) satellites, GEO satellites, High Elliptical Orbit (HEO) satellites, and so on. Nowadays, the third Generation Partnership Project (3GPP) mainly studies LEO satellites and GEO satellites. Among them, an orbit height of an LEO satellite ranges from 500 kilometers (km) to 1500 km, and a corresponding orbit period is about 1.5 hours to 2 hours. A signal propagation delay of single-hop communication between users is usually less than 20 milliseconds (ms), and a maximum satellite visible time is 20 minutes. The NTN technology based on LEO satellite has advantages of short signal propagation distance, less link losses and low requirement on transmission power of user terminals. A GEO satellite has an orbit height of 35786 km and its rotation period around the earth is 24 hours. A signal propagation delay of single-hop communication between users is usually 250 ms. In order to ensure the satellite's coverage area on the earth and improve system capacity of the whole satellite communication system, the satellite use multi-beam to cover the ground. That is, one satellite may form dozens or even hundreds of satellite beams to cover the ground, wherein each satellite beam may cover a ground area with a diameter of tens to hundreds of kilometers.

Cell measurement: usually refers to a mobility measurement in a connected state, and has a process including: a network side device sends a measurement configuration to a UE, and then the UE detects a signal quality status of a neighboring cell according to parameters indicated in the measurement configuration, such as a measurement object and a report configuration, and feeds back a measurement result to the network side device for the network side device to perform switching or improve a neighboring cell relationship list. The UE can measure a signal quality state of a cell by receiving SSB. Here, the measurement object refers to a frequency point to be measured, and the number of measurement object(s) configured by the network side device may be single or plural.

Second, a brief introduction is made to the application scenarios involved in the implementations of the present disclosure.

In a process of cell measurement, there is a certain difference in signal transmission delays between UE and each cell. In order to compensate this difference, in a conventional terrestrial cellular system, the network side device is configured with an SMTC window, so that the UE can receive SSBs of different cells in the SMTC window. At the same time, for cell measurement of inter-frequency or inter-system, the network side device is further configured with a measurement gap window, so that the UE's measurements on all frequency points of inter-frequency or inter-system are within the measurement gap window. At present, a maximum configurable value of duration of the SMTC window is 5 ms (milliseconds), and a maximum configurable value of duration of the measurement gap window is 6 ms (milliseconds).

At present, the SMTC window is configured for frequency points, that is, different SMTC windows may be configured for different frequency points. The measurement gap window is configured for a UE, i.e., different UE may be configured with different measurement gap windows.

However, compared with the conventional terrestrial cellular system, a signal transmission delay between a UE and a satellite in an NTN is greatly increased. In addition, due to large coverage of satellites, signal transmission delays between the UE and different satellites also differ greatly. If a measurement configuration method of the current terrestrial cellular system is used in an NTN system, in order to enable the UE to receive SSBs from different cells in an SMTC window, duration of the SMTC window needs to be greatly prolonged to compensate for the large differences in signal transmission delays between the UE and different cells. At the same time, duration of a measurement gap window for the UE to perform measurement of inter-frequency or inter-system also needs to be prolonged. However, when the duration of the SMTC window is prolonged, it means that the UE will continuously try to receive SSBs within the long SMTC window, which will increase the power consumption of the UE. In addition, after the duration of the measurement gap window is prolonged, it means that communication time between the UE and a serving cell is reduced, which affects the user experience.

Therefore, an implementation of the present disclosure provides a cell measurement method, which can overcome the above-mentioned problems, and the specific implementation mode thereof can be seen in the following.

Next, a brief introduction is made to the implementation environments involved in the implementations of the present disclosure.

Referring to FIG. 1, FIG. 1 is a schematic diagram of an implementation environment according to an exemplary implementation. The implementation environment mainly includes a terminal 110 and a network side device 120. The network side device 120 may be a satellite, which will be described below as an example. As an example, the satellite can provide communication services to the terminal 110 by beamforming, etc.

In the NTN technology, the terminal 110 may also be referred to as an NTN terminal, which may be a terminal defined by the third Generation Partnership Project (3GPP), or a terminal specific to the satellite system when the satellite does not directly serve the terminal defined by 3GPP. In some implementations, the terminal may also be referred to as User Equipment (UE).

The terminal 110 is in communication connection with the satellite through a service link, and the service link refers to a radio link between the terminal 110 and the satellite. In addition, the terminal 110 can also support wireless communication connection with a terrestrial access network.

It should be noted that the above description only takes an example of the implementation environment including one terminal, and in another implementation, the implementation environment may also include multiple terminals, which is not limited in the implementation of the present disclosure.

In addition, it should be noted that in this implementation environment, there may be multiple satellites, which are connected by Inter Satellite/Aerial Links (ISL), and only one satellite is schematically shown in FIG. 1.

After the introduction to the background information, the application scenarios, and the implementation environments involved in the implementations of the present disclosure is made, a cell measurement method according to an implementation of the present disclosure will be described in detail with reference to the drawings.

Referring to FIG. 2, FIG. 2 is a schematic diagram of a flowchart of a cell measurement method according to an exemplary implementation. The method may be applied to the above implementation environment shown in FIG. 1, and is mainly executed by the terminal. Here, a serving cell and a neighboring cell to be measured both belong to the GEO scene which is taken as an example for illustration, that is, the satellite is in a static state, and the method may include the following implementation acts.

Act 201: receiving a first measurement configuration, wherein the first measurement configuration includes a frequency point to be measured, first configuration information of a first measurement window corresponding to the frequency point to be measured, and a whitelist neighboring cell list, as well as a first starting time offset corresponding to a neighboring cell in the whitelist neighboring cell list.

As an example, the network side device may send the first measurement configuration to the connected UE through Radio Resource Control (RRC) signaling.

Among them, the number of frequency point(s) to be measured may be single or plural. When the number of frequency points to be measured is plural, each frequency point to be measured corresponds to its own first configuration information of the first measurement window, and each frequency point to be measured corresponds to its own whitelist neighboring cell list.

Among them, the first configuration information of the first measurement window includes a first window period, a first window starting offset, and first window duration, wherein the first window starting offset refers to a starting time offset of the first measurement window within one first window period.

Illustratively, the first measurement window is an SMTC window. The SMTC window exists periodically, so the first configuration information includes the first window period of the SMTC window. In addition, a starting time point of the SMTC window has an offset with respect to period starting time of each first window period. Here, the offset is indicated by the first window starting offset, for example, the first window starting offset is denoted as SMTC_offset_f. As an example, the starting time offset of the first measurement window in each first window period may be the same. In addition, the network side device also needs to configure the duration of the SMTC window, here, duration of the SMTC window is referred to as the first window duration.

It is not difficult to understand that each frequency point to be measured usually corresponds to multiple cells, but some cells may not need to be measured. Therefore, the first measurement configuration further includes a whitelist neighboring cell list corresponding to the frequency point to be measured, and neighboring cells in the whitelist neighboring cell list are the cells to be measured. Further, the first measurement configuration may also include a blacklist neighbors list corresponding to the frequency point to be measured, and neighboring cells in the blacklist neighbors list are cells that do not need to be measured.

Among them, a neighboring cell in the whitelist neighboring cell list and a current serving cell of the UE may be of intra-frequency, inter-frequency, or inter-system, that is, the neighboring cell and the serving cell in the whitelist neighboring cell list may correspond to the same or different frequency points, or the neighboring cell and the serving cell in the whitelist neighboring cell list may belong to different communication systems.

In this implementation, the first measurement configuration further includes the first starting time offset corresponding to a neighboring cell configuration in the whitelist neighboring cell list. As an example, first starting time offsets corresponding to neighboring cells in the whitelist neighboring cell list include the first starting time offset corresponding to each neighboring cell.

That is, each neighboring cell in the whitelist neighboring cell list corresponds to one first starting time offset. In other words, the first starting time offset corresponding to the neighboring cell in the whitelist neighboring cell list are configured for each neighboring cell. For example, the first starting time offset corresponding to each neighboring cell may be denoted as SMTC_offset_f_i f_i.

As an example, the first starting time offset corresponding to each neighboring cell in the whitelist neighboring cell list is determined by the network side device based on a satellite ephemeris, UE location information and a difference between a first transmission delay and the second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell.

The satellite ephemeris may be used to record position, moving speed, moving direction and other information of satellites.

The location information of the UE may be reported to the network side device in advance by the UE, for example, it may be reported to the network side device by random access when the UE is initially accessed, or it may also be reported to the network side device by other uplink messages.

In addition, the first transmission delay and the second transmission delay corresponding to each neighboring cell may be measured in advance, or may also be evaluated and determined by the network side device according to the satellite ephemeris and the UE location information.

Based on the satellite ephemeris, the UE location information and the difference between the first transmission delay and the second transmission delay corresponding to each neighboring cell, the network side device determines the first starting time offset corresponding to each neighboring cell and configures the first starting time offset in the first measurement configuration.

As an example, if the first transmission delay corresponding to each neighboring cell is greater than the second transmission delay, the first starting time offset corresponding to each neighboring cell is greater than or equal to zero. Alternatively, if the first transmission delay corresponding to each neighboring cell is less than the corresponding second transmission delay, the first starting time offset corresponding to each neighboring cell is less than or equal to zero.

It is not difficult to understand that if the first transmission delay corresponding to a certain neighboring cell is greater than the corresponding second transmission delay, the starting time point of the first measurement window corresponding to the neighboring cell needs to be delayed, so the first starting time offset corresponding to the neighboring cell is greater than or equal to zero. On the contrary, if the first transmission delay corresponding to a certain neighboring cell is less than corresponding the second transmission delay, the starting time point of the first measurement window corresponding to the neighboring cell needs to be put backward so the first starting time offset corresponding to the neighboring cell is less than or equal to zero.

Further, when a neighboring cell in the whitelist neighboring cell list and the current serving cell are of inter-frequency or inter-system, the first measurement configuration further includes second configuration information of a second measurement window and a second starting time offset corresponding to the neighboring cell in the whitelist neighboring cell list.

Illustratively, the second measurement window is a measurement gap window. When the neighboring cell in the whitelist neighboring cell list and the current serving cell are of inter-frequency or inter-system, the UE needs to measure on different frequency points, so the second measurement window needs to be configured. In addition, similar to the configuration of the first measurement window described above, the corresponding second starting time offset is configured for the neighboring cell in the whitelist neighboring cell list.

Among them, the second configuration information includes a second window period, a second window starting offset and second window duration, wherein the second window starting offset is used to indicate a starting time offset of the second measurement window within one second window period.

Illustratively, the second measurement window is a measurement gap window. The measurement gap window exists periodically, so the second configuration information includes the second window period of the measurement gap window. In addition, the starting time point of the measurement gap window has an offset with respect to period starting time of each second window period. Here, the offset is indicated by the second window starting offset, for example, the second window starting offset is denoted asMeasGap_offset. As an example, the starting time offset of the second measurement window in each second window period may be the same. In addition, the network side device further needs to configure duration of the measurement gap window, here, the duration of the measurement gap window is referred to as the second window duration here.

As an example, the second starting time offsets corresponding to the neighboring cells in the whitelist neighboring cell list include the second starting time offset corresponding to each neighboring cell.

That is, each neighboring cell in the whitelist neighboring cell list corresponds to one second starting time offset. In other words, the second starting time offsets corresponding to the neighboring cell in the whitelist neighboring cell list are configured for each neighboring cell. For example, the second starting time offset corresponding to each neighboring cell may be denoted as MeasGap_offset_i.

Further, the second starting time offset corresponding to each neighboring cell in neighboring cells of the whitelist neighboring cell list is determined by the network side device based on a satellite ephemeris, UE location information and a difference between the first transmission delay and the second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell.

A principle here may refer to the principle of the first starting time offset corresponding to each neighboring cell in neighboring cells of the whitelist neighboring cell list described above.

As an example, if the first transmission delay corresponding to each neighboring cell is greater than the corresponding second transmission delay, the second starting time offset corresponding to each neighboring cell is greater than or equal to zero. Alternatively, if the first transmission delay corresponding to each neighboring cell is less than the corresponding second transmission delay, the second starting time offset corresponding to each neighboring cell is less than or equal to zero.

It is not difficult to understand that if the first transmission delay corresponding to a certain neighboring cell is greater than the corresponding second transmission delay, the starting time point of the second measurement window corresponding to the neighboring cell needs to be delayed, so the second starting time offset corresponding to the neighboring cell is greater than or equal to zero. On the contrary, if the first transmission delay corresponding to a certain neighboring cell is less than the corresponding second transmission delay, the starting time point of the second measurement window corresponding to the neighboring cell needs to be put backward, so the second starting time offset corresponding to the neighboring cell is less than or equal to zero.

Further, the above description takes the example that the first starting time offsets corresponding to the neighboring cells in the whitelist neighboring cell list include the first starting time offset corresponding to each neighboring cell. In another implementation, the first starting time offsets corresponding to the neighboring cells in the whitelist neighboring cell list may further include the first starting time offset corresponding to each group of neighboring cells, wherein the difference in signal transmission delays between different neighboring cells in each group of neighboring cells and the UE is within the reference threshold range.

The reference threshold range may be configured by the network side device, or may be predefined.

That is, the network side device may group the neighboring cells according to the difference in signal transmission delays between different neighboring cells in the whitelist neighboring cell list and the UE, so that the signal transmission delays between different neighboring cells in each group of neighboring cells and the UE are almost the same or the same. After that, the corresponding first starting time offsets may be configured for different groups of neighboring cells.

Further, the second starting time offsets corresponding to the neighboring cells in the whitelist neighboring cell list include the second starting time offset corresponding to each group of neighboring cells, wherein the difference in signal transmission delays between different neighboring cells in each group of neighboring cells and the UE is within the reference threshold range.

Configuration principles of the first starting time offsets corresponding to the neighboring cells in the whitelist neighboring cell list are the same, and the second starting time offsets corresponding to the neighboring cells in the whitelist neighboring cell list may also be configured for groups. For details, reference may be made to the detailed introduction about the first starting time offsets corresponding to the neighboring cells in the whitelist neighboring cell list including the first starting time offset corresponding to each group of neighboring cells.

Act 202: determining a Synchronization Signal Block (SSB) receiving window corresponding to a neighboring cell in the whitelist neighboring cell list according to the first configuration information of the first measurement window corresponding to the frequency point to be measured and a first starting time offset corresponding to the neighboring cell in the whitelist neighboring cell list.

Here, the SSB receiving window is used to receive SSBs. In some implementations, it may also be referred to as an SMTC window.

As an example, a specific implementation of Act 202 may include: for a target neighboring cell in the whitelist neighboring cell list, determining the sum of the first starting time offset corresponding to the target neighboring cell and the first window starting offset, wherein the target neighboring cell is any neighboring cell in the whitelist neighboring cell list; performing modulo operation on the determined sum with a first window period, and determining an obtained numerical value as a starting time point of an SSB receiving window corresponding to the target neighboring cell; determining the first window period as a period of the SSB receiving window corresponding to the target neighboring cell, and determining first window duration as duration of the SSB receiving window corresponding to the target neighboring cell.

That is to say, the SSB receiving window corresponding to the target neighboring cell is based on the first starting time offset and is obtained after continuous adjustment on the basis of the first measurement window.

Here, taking the SSB receiving window as the SMTC window as an example, for a neighboring cell i under the frequency point f to be measured, the UE determines an SMTC window corresponding to the neighboring cell i as follows: a period of the SMTC window corresponding to the neighboring cell i is a first window period configured for the frequency point f to be measured in the first measurement configuration, and duration of the SMTC window corresponding to the neighboring cell i is the first window duration for the frequency point f to be measured in the first measurement configuration. In addition, the UE determines a sum of the first window starting offset SMTC_offset_f and the first starting time offset SMTC_offset_f_i corresponding to the neighboring cell i, then performs modulo operation on the sum with the first window period, and then determines a calculation result as the starting time point of the SMTC window corresponding to the neighboring cell i.

In this way, the SSB receiving window corresponding to each neighboring cell in the whitelist neighboring cell list may be determined.

As an example, when a neighboring cell in the whitelist neighboring cell list and the current serving cell are of inter-frequency or inter-system, the terminal also performs the following operations: for a target neighboring cell in the whitelist neighboring cell list, determining a sum of a second starting time offset corresponding to the target neighboring cell and a second window starting offset, wherein the target neighboring cell is any neighboring cell in the whitelist neighboring cell list; performing modulo operation on the determined sum with a second window period, and determining the obtained numerical value as a starting time point of a measurement gap window corresponding to the target neighboring cell; determining the second window period as the period of the measurement gap window corresponding to the target neighboring cell, and determining a second window duration as duration of the measurement gap window corresponding to the target neighboring cell.

For its implementation, reference may be made to the related introduction of determining the SSB receiving window corresponding to the target neighboring cell.

It should be noted that when corresponding first starting time offsets are configured for different groups of neighboring cells, the SSB receiving window determined here may also be determined for a group, that is, the SSB receiving window corresponding to each group may be suitable for the measurement of each neighboring cell in the group.

Act 203: measuring each neighboring cell in the whitelist neighboring cell list based on the SSB receiving window corresponding to the neighboring cells in the whitelist neighboring cell list.

That is, the terminal receives the SSB sent by each neighboring cell in the SSB receiving window corresponding to the neighboring cells in the whitelist neighboring cell list, so as to measure each neighboring cell through the SSBs.

As an example, when a neighboring cell in the whitelist neighboring cell list and the current serving cell are of inter-frequency or inter-system, Act 203 includes: measuring each neighboring cell in the whitelist neighboring cell list based on the SSB receiving window and the measurement gap window corresponding to the neighboring cell in the whitelist neighboring cell list.

That is, the terminal receives the SSB sent by each neighboring cell in the SSB receiving window corresponding to the neighboring cell in the whitelist neighboring cell list, and at the same time completes the measurement of the frequency point to be measured in the measurement gap window corresponding to the neighboring cell in the whitelist neighboring cell list, so as to measure each neighboring cell through the SSB.

In an implementation of the present disclosure, a first measurement configuration is received, wherein the first measurement configuration includes not only a frequency point to be measured, first configuration information of a first measurement window corresponding to the frequency point to be measured, and a whitelist neighboring cell list, but also a first starting time offset corresponding to a neighboring cell in the whitelist neighboring cell list, that is, the first starting time offset is also configured for the neighboring cell in the whitelist neighboring cell list. In this way, a Synchronization Signal Block (SSB) receiving window corresponding to a neighboring cell in the whitelist neighboring cell list may be determined according to the first configuration information of the first measurement window corresponding to the frequency point to be measured and the first starting time offset corresponding to the neighboring cell in the whitelist neighboring cell list, so that each neighboring cell in the whitelist neighboring cell list is measured based on the SSB receiving window corresponding to the neighboring cell in the whitelist neighboring cell list. Therefore, different first measurement windows can be determined for different neighboring cells. This ensures that the UE can receive SSBs of the neighboring cell in the first measurement window, avoids the problem that the UE needs to continuously perform detection due to the need of delaying window duration, and thereby saving power consumption of the terminal.

For the sake of understanding, a specific example will be taken as an example to explain the above implementations. It is assumed that there are three NTN cells, namely, cell0, cell1 and cell2. In which a serving cell of a UE is cell0, and a signal transmission delay between the serving cell and the UE is delay_0, and cell1 and cell2 are two cells on different frequency points f. Network side devices of these three cells sends SSBs at the same time.

The UE receives the first measurement configuration sent by the network side device of the serving cell, and the first measurement configuration specifically includes:

the frequency point f to be measured and the whitelist neighboring cell list corresponding to the frequency point f to be measured. The whitelist neighboring cell list includes neighboring cells cell1 and cell2. For the frequency point f to be measured, the network side device configures a first measurement window, which carries first configuration information. The first configuration information includes the first window period of the first measurement window, the starting time offset of the first measurement window within one first window period, i.e., the first window starting offset SMTC_offset_f, and the first window duration.

Moreover, since the measurement is an inter-frequency measurement, the first measurement configuration further includes second configuration information of the second configuration window, wherein the second configuration information includes the second window period, the starting time offset of the second measurement window in one second window period, i.e., the second window starting offset MeasGap_offset, and the second window duration.

For cell1 and cell2, the network side device can estimate signal transmission delays, namely delay_1 and delay_2, between the UE and these two cells according to the satellite ephemeris and UE location information, and then compare the delays with delay_0 to determine the following information: for cell1, it is configured that the first starting time offset is SMTC_offset_f_1 and the second starting time offset measurement gap is_offset_1=0; for cell2, it is configured that the first starting time offset is SMTC_offset_f_2 and the second starting time offset is gap_offset_2.

According to the first measurement configuration, the UE determines SSB receiving windows of the UE in the neighboring cells cell1 and cell2 respectively. Specifically, the UE determines the first measurement window of each neighboring cell according to the first configuration information, and then adjusts the starting position of the first measurement window according to SMTC_offset_f_1 and SMTC_offset_f_2 respectively corresponding to the neighboring cells cell1 and cell2. As shown in FIG. 3, the SSB receiving windows corresponding to the neighboring cells cell1 and cell2 are obtained.

In addition, the UE determines measurement gap windows of the UE in the neighboring cells cell1 and cell2 respectively according to the first measurement configuration. Specifically, the UE determines the second measurement window of each neighboring cell according to the second configuration information, and then adjusts starting positions of the second measurement windows according to gap_offset_1 and gap_offset_2 respectively corresponding to the neighboring cells cell1 and cell2. As shown in FIG. 3, the measurement gap windows corresponding to the neighboring cells cell1 and cell2 are obtained.

Thereafter, the UE measures the neighboring cell cell1 based on the determined SSB receiving window and measurement gap window corresponding to the neighboring cell cell1, and measures the neighboring cell cell2 based on the determined SSB receiving window and measurement gap window corresponding to cell2.

Figure 4:
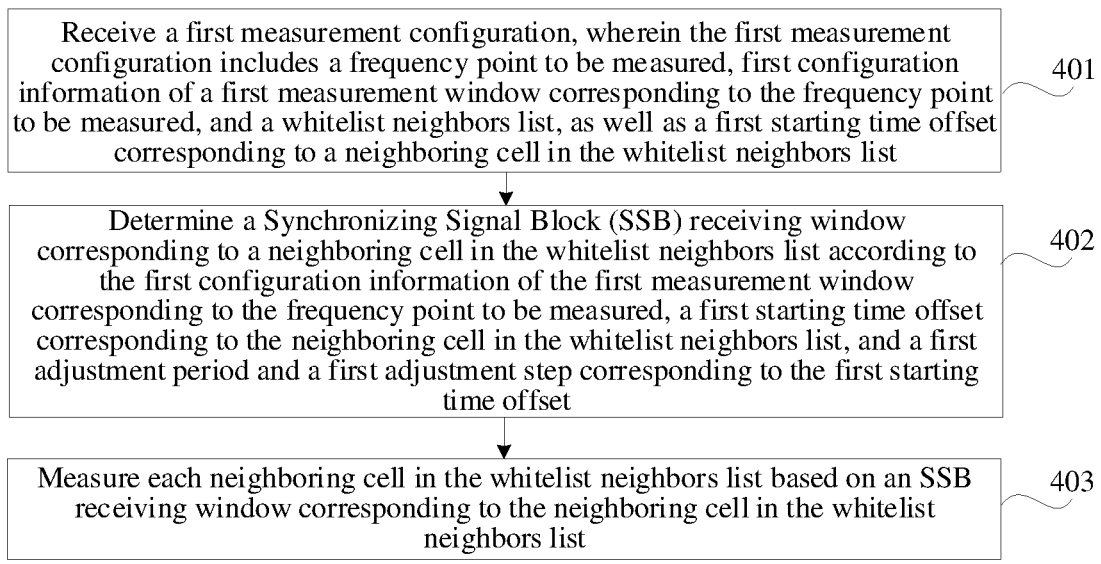
FIG. 4 is a flowchart of a cell measurement method according to another exemplary implementation of the present disclosure.

Referring to FIG. 4, FIG. 4 is a schematic diagram of a flowchart of a cell measurement method according to another exemplary implementation. The cell measurement method may be applied to the above implementation environment shown in FIG. 1, and is mainly executed by the terminal. Here, an example in which at least one of the current serving cell and the neighboring cell to be measured of the UE belongs to the non-GEO scene is taken for illustration, that is, the satellite is in a moving state, and the method may include the following implementation acts:

Act 401: receiving a first measurement configuration, wherein the first measurement configuration includes a frequency point to be measured, first configuration information of a first measurement window corresponding to the frequency point to be measured, and a whitelist neighboring cell list, as well as a first starting time offset corresponding to a neighboring cell in the whitelist neighboring cell list.

Among them, the first configuration information includes a first window period, a first window starting offset, and first window duration, wherein the first window starting offset refers to a starting time offset of the first measurement window within one first window period.

As an example, first starting time offsets corresponding to neighboring cells in the whitelist neighboring cell list include the first starting time offset corresponding to each neighboring cell.

As an example, the first starting time offset corresponding to each neighboring cell in the whitelist neighboring cell list is determined by the network side device based on a satellite ephemeris, UE location information and a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell.

As an example, if the first transmission delay corresponding to each neighboring cell is greater than the corresponding second transmission delay, the first starting time offset corresponding to each neighboring cell is greater than or equal to zero. Alternatively, if the first transmission delay corresponding to each neighboring cell is less than the corresponding second transmission delay, the first starting time offset corresponding to each neighboring cell is less than or equal to zero.

As an example, first starting time offsets corresponding to the neighboring cells in the whitelist neighboring cell list include the first starting time offset corresponding to each group of neighboring cells, wherein a difference in signal transmission delays between different neighboring cells in each group of neighboring cells and the UE is within a reference threshold range.

It should be noted that the explanations of the above examples may be found in the above implementations.

In a possible implementation of the present disclosure, the first measurement configuration further includes a first adjustment period and a first adjustment step of the first starting time offset corresponding to a neighboring cell in the whitelist neighboring cell list.

In a non-GEO scene, because the satellite is moving, a signal transmission delay between a neighboring cell and a UE is constantly changing. Therefore, it is necessary to continuously adjust a first starting time offset corresponding to the neighboring cell in the whitelist neighboring cell list. Therefore, the network side device configures corresponding first adjustment period and first adjustment step for the first starting time offset corresponding to the neighboring cell in the whitelist neighboring cell list, that is to say, the first starting time offset corresponding to the neighboring cell in the whitelist neighboring cell list included in the first measurement configuration is an initial value, which needs to be adjusted with the first adjustment period and first adjustment step subsequently. The first adjustment step may be positive, negative or zero. As an example, the first adjustment period may be the above-mentioned first window period.

As an example, the first adjustment period and the first adjustment step of the first starting time offset corresponding to the neighboring cell in the whitelist neighboring cell list are configured by the network side device according to movement rules of the satellite and the UE.

Among them, the movement rule of the satellite may be determined according to satellite ephemeris, and may be reported to the network side device by the UE.

For example, if a moving direction of the satellite is the same as that of the UE, but a moving speed of the satellite is greater than that of the UE, then the first adjustment period may be configured to be a little smaller and the first adjustment step length may be configured to be a little longer, so that the UE can adjust frequently, and an amplitude of each adjustment is larger.

When a neighboring cell in the whitelist neighboring cell list and a current serving cell of the UE are of inter-frequency or inter-system, the first measurement configuration further includes second configuration information of a second measurement window and a second starting time offset corresponding to the neighboring cell in the whitelist neighboring cell list.

Among them, the second configuration information includes a second window period, a second window starting offset and second window duration, wherein the second window starting offset indicates the starting time offset of the second measurement window within one second window period.

As an example, second starting time offsets corresponding to neighboring cells in the whitelist neighboring cell list include the second starting time offset corresponding to each neighboring cell.

As an example, the second starting time offset corresponding to each neighboring cell in the neighboring cells of the whitelist neighboring cell list is determined by the network side device based on a satellite ephemeris, UE location information and a difference between the first transmission delay and the second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell.

As an example, if the first transmission delay corresponding to each neighboring cell is greater than the corresponding second transmission delay, the second starting time offset corresponding to each neighboring cell is greater than or equal to zero. Alternatively, if the first transmission delay corresponding to each neighboring cell is less than the corresponding second transmission delay, the second starting time offset corresponding to each neighboring cell is less than or equal to zero.

As an example, the second starting time offsets corresponding to the neighboring cells in the whitelist neighboring cell list include the second starting time offset corresponding to each group of neighboring cells, wherein a difference in signal transmission delays between different neighboring cells in each group of neighboring cells and the UE is within a reference threshold range.

Further, the first measurement configuration further includes a second adjustment period and a second adjustment step of the second starting time offset corresponding to the neighboring cell in the whitelist neighboring cell list.

As mentioned above, because the satellite is moving in the non-GEO scene, a signal transmission delay between a neighboring cell and the UE is constantly changing. Therefore, it is necessary to continuously adjust the second starting time offset corresponding to the neighboring cell in the whitelist neighboring cell list. For this reason, corresponding second adjustment period and second adjustment step may be configured for the second starting time offset corresponding to the neighboring cell in the whitelist neighboring cell list. In this case, the second starting time offset corresponding to the neighboring cell in the whitelist neighboring cell list included in the first measurement configuration is an initial value, which needs to be continuously adjusted according to the second adjustment period and the second adjustment step subsequently. Herein, the second adjustment step may be positive, negative or zero. In addition, as an example, the second adjustment period may be the above-mentioned second window period.

Further, the second adjustment period and the second adjustment step of the second starting time offset corresponding to the neighboring cell in the whitelist neighboring cell list are configured by the network side device according to the movement rules of the satellite and the UE.

For its implementation principle, reference may be made to the above detailed implementation description about the first adjustment period and the first adjustment step of the first starting time offset corresponding to the neighboring cell in the whitelist neighboring cell list.

Act 402: determining a Synchronization Signal Block (SSB) receiving window corresponding to the neighboring cell in the whitelist neighboring cell list according to the first configuration information of the first measurement window corresponding to the frequency point to be measured, the first starting time offset corresponding to the neighboring cell in the whitelist neighboring cell list, and the first adjustment period and the first adjustment step corresponding to the first starting time offset.

In an initial measurement, or in a measurement period, the UE determines an SSB receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list. For the specific implementation thereof, reference may be made to the above. Thereafter, the UE adjusts the first starting time offset according to the first adjustment period and the first adjustment step, and then determines the SSB receiving window corresponding to the neighboring cell in the whitelist neighboring cell list according to the first configuration information of the first measurement window corresponding to the frequency point to be measured and the adjusted first starting time offset corresponding to the neighboring cell in the whitelist neighboring cell list.

Further, when the neighboring cell in the whitelist neighboring cell list and the current serving cell are of inter-frequency or inter-system, the UE also needs to determine the measurement gap window corresponding to the neighboring cells in the whitelist neighboring cell list according to the second configuration information of the second measurement window, the second starting time offset corresponding to the neighboring cell in the whitelist neighboring cell list, and the second adjustment period and the second adjustment step corresponding to the second starting time offset. For the implementation principle thereof, reference may be made to the detailed description of Act 402.

Act 403: measuring each neighboring cell in the whitelist neighboring cell list based on the SSB receiving window corresponding to the neighboring cell in the whitelist neighboring cell list.

For the specific implementation, reference may be made to the act 203 in the implementation shown in FIG. 2.

In the implementation of the present disclosure, in a case that at least one of the neighboring cell and the serving cell belongs to a non-GEO scene, the first starting time offset corresponding to the neighboring cell in the whitelist neighboring cell list is configured with the first adjustment period and the first adjustment step, so that the SSB receiving window determined after adjustment according to the first adjustment period and the first adjustment step can adapt to the measurement of the changed neighboring cell.

For the sake of understanding, a specific example will be taken here as an example to explain an implementation process of the above implementation shown in the above FIG. 4. It is assumed that there are three NTN cells, namely, cell0, cell1 and cell2. Among them, a serving cell of a UE is cell0, and a signal transmission delay between UE and cell0 is delay_0. Cell1 and cell2 are two cells on different frequency points f. Network side devices of these three cells sends SSBs at the same time.

The UE receives a second measurement configuration sent by the network side device of the serving cell, and the second measurement configuration includes a point f to be measured and a whitelist neighboring cell list corresponding to the point f to be measured, wherein the whitelist neighboring cell list includes neighboring cells cell1 and cell2.

For the frequency point f to be measured, the network side device configures a first measurement window, which specifically includes a first window period, a first window starting offset SMTC_offset, and first window duration.

In addition, the network side device is further configured with a second measurement window, which includes a second window period, a second window starting offset, and second window duration.

For cell1 and cell2, the network side device can estimate signal transmission delays, namely delay_1 and delay_2, between the UE and these two cells according to a satellite ephemeris and UE location information, and then compare the delays with delay_0 to determine a first starting time offset SMTC offset_1 corresponding to cell1 and a first starting time offset SMTC offset_2 corresponding to cell2. In addition, a second starting time offset gap offset_1 corresponding to cell1 and a second starting time offset gap offset_1 corresponding to cell2 are determined.

In addition, by combining the movement rules of the satellite and the UE, the network side device determines a first adjustment period (for example, the first window period) and a first adjustment step delta SMTC offset_1 of the first starting time offset corresponding to cell1, and determines a first adjustment period (for example, the first window period) and a first adjustment step delta SMTC offset_2 of the first starting time offset corresponding to cell2. In addition, it is also necessary to determine a second adjustment period (for example, the second window period) and a second adjustment step delta gap offset_1 of the second starting time offset corresponding to cell1, and determine a second adjustment period (for example, the second window period) of the second starting time offset corresponding to cell2. The above information is then configured in the first measurement configuration.

Figure 5:
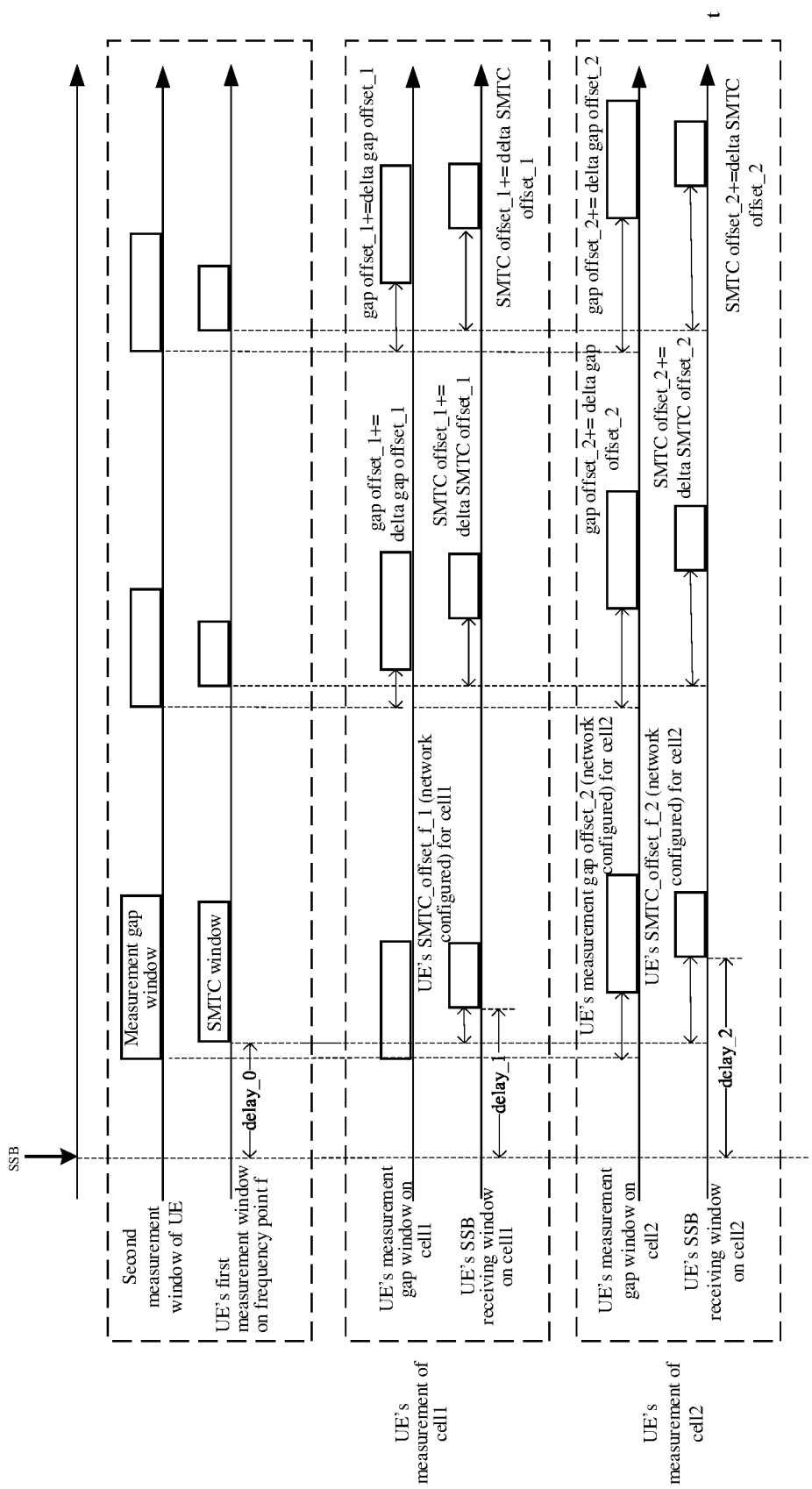
FIG. 5 is a schematic diagram of a measurement window according to another exemplary implementation of the present disclosure.

According to the first measurement configuration, the UE respectively determines SSB receiving windows and measurement gap windows in the neighboring cells cell1 and cell2, and at the same time periodically updates starting positions of the measurement SSB receiving windows and the measurement gap windows, as shown in the following FIG. 5.

With regard to the neighboring cells cell1 and cell2, the UE performs measurement on these two neighboring cells according to the determined SSB receiving windows and measurement gap windows.

As an example, an implementation of the present disclosure further provides a cell measurement method, which can be applied to the above implementation environment shown in FIG. 1 and is mainly executed by the terminal. Here, an example in which the serving cell and the neighboring cell to be measured both belong to the GEO scene is taken for illustration, that is, the satellite is in a static state, and the method may include the following implementation acts:

Act A1: receiving a second measurement configuration, wherein the second measurement configuration includes a frequency point to be measured, a whitelist neighboring cell list corresponding to the frequency point to be measured and first configuration information of a first measurement window.

Among them, the first configuration information includes a first window period, a first window starting offset, and first window duration, wherein the first window starting offset refers to a starting time offset of the first measurement window within one first window period.

As an example, when a neighboring cell in the whitelist neighboring cell list and a current serving cell are of inter-frequency or inter-system, the second measurement configuration further includes second configuration information of a second measurement window.

Among them, the second configuration information includes a second window period, a second window starting offset and second window duration, wherein the second window starting offset is used to indicate a starting time offset of the second measurement window within one second window period.

Act A2: determining a first starting time offset corresponding to a neighboring cell in the whitelist neighboring cell list.

That is, in the implementation of the present disclosure, the first starting time offset corresponding to the neighboring cell in the whitelist neighboring cell list is determined by the terminal.

As an example, first starting time offsets corresponding to neighboring cells in the whitelist neighboring cell list include the first starting time offset corresponding to each neighboring cell.

A specific implementation of this act may include: determining a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell; and determining a first starting time offset corresponding to the neighboring cell in the whitelist neighboring cell list based on a satellite ephemeris, UE location information and the difference between the first transmission delay and the second transmission delay corresponding to each neighboring cell.

As an example, if the first transmission delay corresponding to each neighboring cell is greater than the corresponding second transmission delay, the first starting time offset corresponding to each neighboring cell is greater than or equal to zero. Alternatively, if the first transmission delay corresponding to each neighboring cell is less than the corresponding second transmission delay, the first starting time offset corresponding to each neighboring cell is less than or equal to zero.

Further, first starting time offsets corresponding to the neighboring cells in the whitelist neighboring cell list include the first starting time offset corresponding to each group of neighboring cells, wherein a difference in signal transmission delays between different neighboring cells in each group of neighboring cells and the UE is within a reference threshold range.

Further, when a neighboring cell in the whitelist neighboring cell list and the current serving cell are of inter-frequency or inter-system, the UE also determines a second starting time offset corresponding to the neighboring cell in the whitelist neighboring cell list.

As an example, second starting time offsets corresponding to the neighboring cells in the whitelist neighboring cell list include the second starting time offset corresponding to each neighboring cell.

Further, the difference between the first transmission delay and the second transmission delay corresponding to each neighboring cell is determined. The first transmission delay corresponding to each neighboring cell refers to a signal transmission delay between the neighboring cell and the UE, and the second transmission delay refers to a signal transmission delay between the UE and the current serving cell. The second starting time offset corresponding to each neighboring cell in the whitelist neighboring cell list is determined based on a satellite ephemeris, UE location information and the difference between the first transmission delay and the second transmission delay corresponding to each neighboring cell.

Further, if the first transmission delay corresponding to each neighboring cell is greater than the corresponding second transmission delay, the second starting time offset corresponding to each neighboring cell is greater than or equal to zero. Alternatively, if the first transmission delay corresponding to each neighboring cell is less than the corresponding second transmission delay, the second starting time offset corresponding to each neighboring cell is less than or equal to zero.

Further, the second starting time offsets corresponding to the neighboring cells in the whitelist neighboring cell list include the second starting time offset corresponding to each group of neighboring cells, wherein a difference in signal transmission delays between different neighboring cells in each group of neighboring cells and the UE is within a reference threshold range.

Act A3: determining a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list.

As an example, a specific implementation of this act may include: for a target neighboring cell in the whitelist neighboring cell list, determining a sum of a first starting time offset corresponding to the target neighboring cell and the first window starting offset, wherein the target neighboring cell is any neighboring cell in the whitelist neighboring cell list; performing modulo operation on the determined sum with the first window period, and determining an obtained numerical value as a starting time point of an SSB receiving window corresponding to the target neighboring cell; determining the first window period as a period of the SSB receiving window corresponding to the target neighboring cell, and determining the first window duration as duration of the SSB receiving window corresponding to the target neighboring cell.

Further, when a neighboring cell in the whitelist neighboring cell list and the current serving cell are of inter-frequency or inter-system, the UE also performs the following operations: for a target neighboring cell in the whitelist neighboring cell list, determining a sum of a second starting time offset corresponding to the target neighboring cell and the second window starting offset, wherein the target neighboring cell is any neighboring cell in the whitelist neighboring cell list; performing modulo operation on the determined sum with the second window period, and determining an obtained numerical value as a starting time point of a measurement gap window corresponding to the target neighboring cell; and determining the second window period as a period of the measurement gap window corresponding to the target neighboring cell, and determining the second window duration as duration of the measurement gap window corresponding to the target neighboring cell.

Act A4: measuring each neighboring cell in the whitelist neighboring cell list based on the SSB receiving window corresponding to the neighboring cell in the whitelist neighboring cell list.

Further, each neighboring cell in the whitelist neighboring cell list is measured based on the SSB receiving window and the measurement gap window corresponding to the neighboring cell in the whitelist neighboring cell list.

It should be noted that for the operations performed by the UE in this implementation, reference may be made to the above implementation shown in FIG. 2.

In an implementation of the present disclosure, a first measurement configuration is received, wherein the first measurement configuration includes a frequency point to be measured, first configuration information of a first measurement window corresponding to the frequency point to be measured to be measured, and a whitelist neighboring cell list. A first starting time offset corresponding to a neighboring cell in the whitelist neighboring cell list is determined. In this way, a SSB receiving window corresponding to the neighboring cell in the whitelist neighboring cell list may be determined according to the first configuration information of the first measurement window corresponding to the frequency point to be measured and the first starting time offset corresponding to the neighboring cell in the whitelist neighboring cell list, so that each neighboring cell in the whitelist neighboring cell list is measured based on the SSB receiving window corresponding to the neighboring cell in the whitelist neighboring cell list. Therefore, different first measurement windows can be determined for different neighboring cells. This ensures that a UE can receive SSBs of the neighboring cell in the first measurement window, avoids the problem that the UE needs to continuously perform detection due to the need of delaying window duration, and thereby saving power consumption of the terminal.

For the sake of understanding, a specific example will be taken as an example to explain the above implementations. It is assumed that there are three NTN cells, namely, cell0, cell1 and cell2. Among them, a serving cell of a UE is cell0, and a signal transmission delay between the serving cell and the UE is delay_0. Cell1 and cell2 are two cells on different frequency points f. Network side devices of these three cells sends SSBs at the same time.

The UE receives a first measurement configuration sent by the network side device of the serving cell, and the first measurement configuration specifically includes:

the frequency point f to be measured and the whitelist neighboring cell list corresponding to the frequency point f to be measured. The whitelist neighboring cell list includes neighboring cells cell1 and cell2. For the frequency point f to be measured, the network side device configures a first measurement window, which carries first configuration information. The first configuration information includes the first window period of the first measurement window, the starting time offset of the first measurement window within one first window period, i.e., the first window starting offset SMTC_offset_f, and the first window duration.

Moreover, since the measurement is an inter-frequency measurement, the first measurement configuration further includes second configuration information of the second configuration window, wherein the second configuration information includes the second window period, the starting time offset of the second measurement window in one second window period, i.e., the second window starting offset MeasGap_offset, and the second window duration.

For cell1 and cell2, the UE can estimate signal transmission delays, namely delay_1 and delay_2, between the UE and these two cells according to a satellite ephemeris and UE location information, and then compare the delays with delay_0 to determine the following information: for cell1, it is determined that the first starting time offset is SMTC_offset_f_1 and the second starting time offset measurement gap is_offset_1=0; for cell2, it is determined that the first starting time offset is SMTC_offset_f_2 and the second starting time offset is gap_offset_2.

Figure 6:
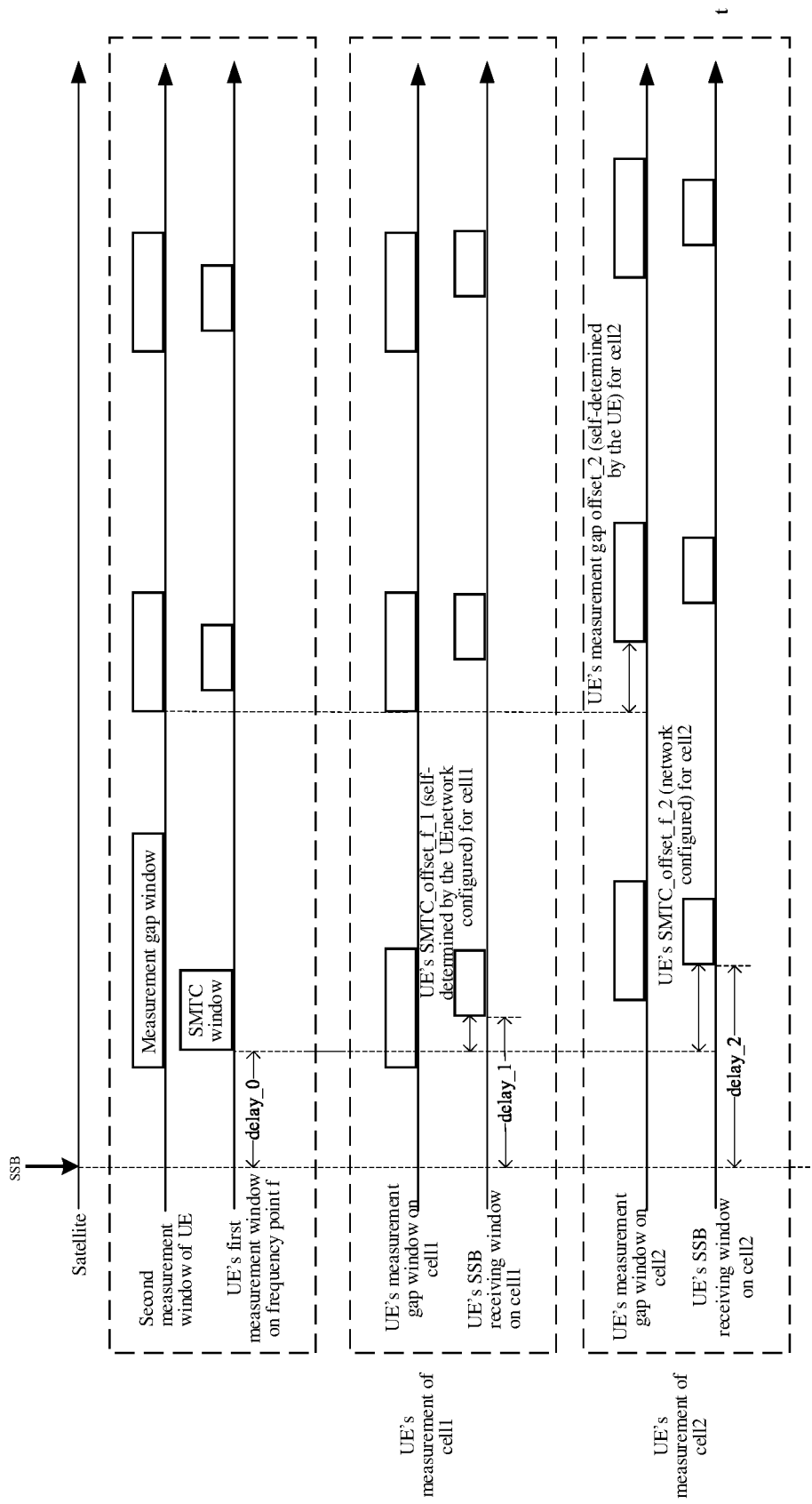
FIG. 6 is a schematic diagram of a measurement window according to another exemplary implementation of the present disclosure.

According to the first measurement configuration and the determined information, the UE determines SSB receiving windows of the UE in the neighboring cells cell1 and cell2 respectively. Specifically, the UE determines the first measurement window of each neighboring cell according to the first configuration information, and then adjusts the starting position of the first measurement window according to SMTC_offset_f_1 and SMTC_offset_f_2 respectively corresponding to the neighboring cells cell1 and cell2. As shown in FIG. 6, the SSB receiving windows corresponding to the neighboring cells cell1 and cell2 are obtained.

In addition, the UE determines measurement gap windows of the UE in the neighboring cells cell1 and cell2 respectively according to the first measurement configuration. Specifically, the UE determines the second measurement window of each neighboring cell according to the second configuration information, and then adjusts starting positions of the second measurement windows according to gap_offset_1 and gap_offset_2 respectively corresponding to the neighboring cells cell1 and cell2. As shown in FIG. 6, the measurement gap windows corresponding to the neighboring cells cell1 and cell2 are obtained.

Thereafter, the UE measures the neighboring cell cell1 based on the determined SSB receiving window and measurement gap window corresponding to the neighboring cell cell1, and measures the neighboring cell cell2 based on the determined SSB receiving window and measurement gap window corresponding to cell2.

As an example, an implementation of the present disclosure further provides a cell measurement method, which can be applied to the above implementation environment shown in FIG. 1 and is mainly executed by the terminal. Here, an example in which at least one of the serving cell and the neighboring cell to be measured belongs to the GEO scene is taken for illustration, that is, the satellite is in a moving state, and the method may include the following implementation acts:

Act B1: receiving a second measurement configuration, wherein the second measurement configuration includes a frequency point to be measured, a whitelist neighboring cell list corresponding to the frequency point to be measured and first configuration information of a first measurement window.

Among them, the first configuration information includes a first window period, a first window starting offset, and first window duration, wherein the first window starting offset refers to a starting time offset of the first measurement window within one first window period.

As an example, when a neighboring cell in the whitelist neighboring cell list and a current serving cell are of inter-frequency or inter-system, the second measurement configuration further includes second configuration information of a second measurement window.

Among them, the second configuration information includes a second window period, a second window starting offset and second window duration, wherein the second window starting offset is used to indicate a starting time offset of the second measurement window within one second window period.

Act B2: determining a first starting time offset corresponding to a neighboring cell in the whitelist neighboring cell list.

That is, in the implementation of the present disclosure, the first starting time offset corresponding to the neighboring cell in the whitelist neighboring cell list is determined by the terminal.

As an example, first starting time offsets corresponding to neighboring cells in the whitelist neighboring cell list include the first starting time offset corresponding to each neighboring cell.

A specific implementation of this act may include: determining a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell; and determining a first starting time offset corresponding to the neighboring cell in the whitelist neighboring cell list based on a satellite ephemeris, UE location information and the difference between the first transmission delay and the second transmission delay corresponding to each neighboring cell.

As an example, if the first transmission delay corresponding to each neighboring cell is greater than the corresponding second transmission delay, the first starting time offset corresponding to each neighboring cell is greater than or equal to zero. Alternatively, if the first transmission delay corresponding to each neighboring cell is less than the corresponding second transmission delay, the first starting time offset corresponding to each neighboring cell is less than or equal to zero.

Further, first starting time offsets corresponding to the neighboring cells in the whitelist neighboring cell list include the first starting time offset corresponding to each group of neighboring cells, wherein a difference in signal transmission delays between different neighboring cells in each group of neighboring cells and the UE is within a reference threshold range.

Further, the UE determine a first adjustment period and a first adjustment step of the first starting time offset corresponding to the neighboring cell in the whitelist neighboring cell list.

As an example, the first adjustment period and the first adjustment step of the first starting time offset corresponding to neighboring cell in the whitelist neighboring cell list are configured according to movement rules of the satellite and the UE.

Further, when a neighboring cell in the whitelist neighboring cell list and the current serving cell are of inter-frequency or inter-system, the UE also determines a second starting time offset corresponding to the neighboring cell in the whitelist neighboring cell list.

As an example, second starting time offsets corresponding to the neighboring cells in the whitelist neighboring cell list include the second starting time offset corresponding to each neighboring cell.

Further, the difference between the first transmission delay and the second transmission delay corresponding to each neighboring cell is determined. The first transmission delay corresponding to each neighboring cell refers to a signal transmission delay between the neighboring cell and the UE, and the second transmission delay refers to a signal transmission delay between the UE and the current serving cell. The second starting time offset corresponding to each neighboring cell in the whitelist neighboring cell list is determined based on a satellite ephemeris, UE location information and the difference between the first transmission delay and the second transmission delay corresponding to each neighboring cell.

Further, if the first transmission delay corresponding to each neighboring cell is greater than the corresponding second transmission delay, the second starting time offset corresponding to each neighboring cell is greater than or equal to zero. Alternatively, if the first transmission delay corresponding to each neighboring cell is less than the corresponding second transmission delay, the second starting time offset corresponding to each neighboring cell is less than or equal to zero.

Further, the second starting time offsets corresponding to the neighboring cells in the whitelist neighboring cell list include the second starting time offset corresponding to each group of neighboring cells, wherein a difference in signal transmission delays between different neighboring cells in each group of neighboring cells and the UE is within a reference threshold range.

Further, a second adjustment period and a second adjustment step of the second starting time offset corresponding to neighboring cell in the whitelist neighboring cell list are determined.

As an example, the second adjustment period and the second adjustment step of the second starting time offset corresponding to neighboring cell in the whitelist neighboring cell list are configured according to the movement rules of the satellite and the UE.

Act B3: determining a Synchronization Signal Block (SSB) receiving window corresponding to the neighboring cells in the whitelist neighboring cell list according to the first configuration information of the first measurement window corresponding to the frequency point to be measured and the first starting time offset corresponding to the neighboring cell in the whitelist neighboring cell list.

As an example, a specific implementation of this act may include: for a target neighboring cell in the whitelist neighboring cell list, determining a sum of a first starting time offset corresponding to the target neighboring cell and the first window starting offset, wherein the target neighboring cell is any neighboring cell in the whitelist neighboring cell list; performing modulo operation on the determined sum with the first window period, and determining an obtained numerical value as a starting time point of an SSB receiving window corresponding to the target neighboring cell; determining the first window period as a period of the SSB receiving window corresponding to the target neighboring cell, and determining the first window duration as duration of the SSB receiving window corresponding to the target neighboring cell.

Further, when a neighboring cells in the whitelist neighboring cell list and the current serving cell are of inter-frequency or inter-system, the UE also performs the following operations: for a target neighboring cell in the whitelist neighboring cell list, determining a sum of a second starting time offset corresponding to the target neighboring cell and the second window starting offset, wherein the target neighboring cell is any neighboring cell in the whitelist neighboring cell list; performing modulo operation on the determined sum with the second window period, and determining an obtained numerical value as a starting time point of a measurement gap window corresponding to the target neighboring cell; and determining the second window period as a period of the measurement gap window corresponding to the target neighboring cell, and determining the second window duration as duration of the measurement gap window corresponding to the target neighboring cell.

Act B4: measuring each neighboring cell in the whitelist neighboring cell list based on the SSB receiving window corresponding to the neighboring cell in the whitelist neighboring cell list.

Further, each neighboring cell in the whitelist neighboring cell list is measured based on the SSB receiving window and the measurement gap window corresponding to the neighboring cell in the whitelist neighboring cell list.

It should be noted that for the operations performed by the UE in this implementation, reference may be made to the above implementation shown in FIG. 4.

In an implementation of the present disclosure, in a case that at least one of a neighboring cell and the serving cell belongs to the non-GEO scene, the UE determines the first starting time offset corresponding to the neighboring cell in the whitelist neighboring cell list to configure a first adjustment period and a first adjustment step, so that an SSB receiving window determined after adjustment according to the first adjustment period and the first adjustment step can adapt to the measurement of the changed neighboring cell.

For the sake of understanding, a specific example is taken here as an example to explain an implementation process of the above implementations. It is assumed that there are three NTN cells, namely, cell0, cell1 and cell2. Among them, a serving cell of a UE is cell0, and a signal transmission delay between the UE and cell0 is delay_0. Cell1 and cell2 are two cells on different frequency points f. Network side devices of these three cells send SSBs at the same time.

The UE receives a second measurement configuration sent by the network side device of the serving cell, wherein the second measurement configuration includes a point f to be measured and a whitelist neighboring cell list corresponding to the point f to be measured, wherein the whitelist neighboring cell list includes neighboring cells cell1 and cell2.

For the frequency point f to be measured, the network side device configures a first measurement window, which specifically includes a first window period, a first window starting offset SMTC_offset, and first window duration.

In addition, the network side device is also configured with a second measurement window, which includes a second window period, a second window starting offset, and second window duration.

For cell1 and cell2, the UE can estimate signal transmission delays, namely delay_1 and delay_2, between the UE and these two cells according to a satellite ephemeris and UE location information, and then compare the delays with delay_0 to determine a first starting time offset SMTC offset_1 corresponding to cell1 and a first starting time offset SMTC offset_2 corresponding to cell2. In addition, a second starting time offset gap offset_1 corresponding to cell1 and a second starting time offset gap offset_1 corresponding to cell2 are determined.

In addition, by combining the movement rules of the satellite and the UE, the UE determines a first adjustment period (for example, the first window period) and a first adjustment step delta SMTC offset_1 of the first starting time offset corresponding to cell1, and determines a first adjustment period (for example, the first window period) and a first adjustment step delta SMTC offset_2 of the first starting time offset corresponding to cell2. In addition, it is also necessary to determine a second adjustment period (for example, the second window period) and a second adjustment step delta gap offset_1 of the second starting time offset corresponding to cell1, and determine a second adjustment period (for example, the second window period) of the second starting time offset corresponding to cell2. The above information is then configured in the first measurement configuration.

Figure 7:
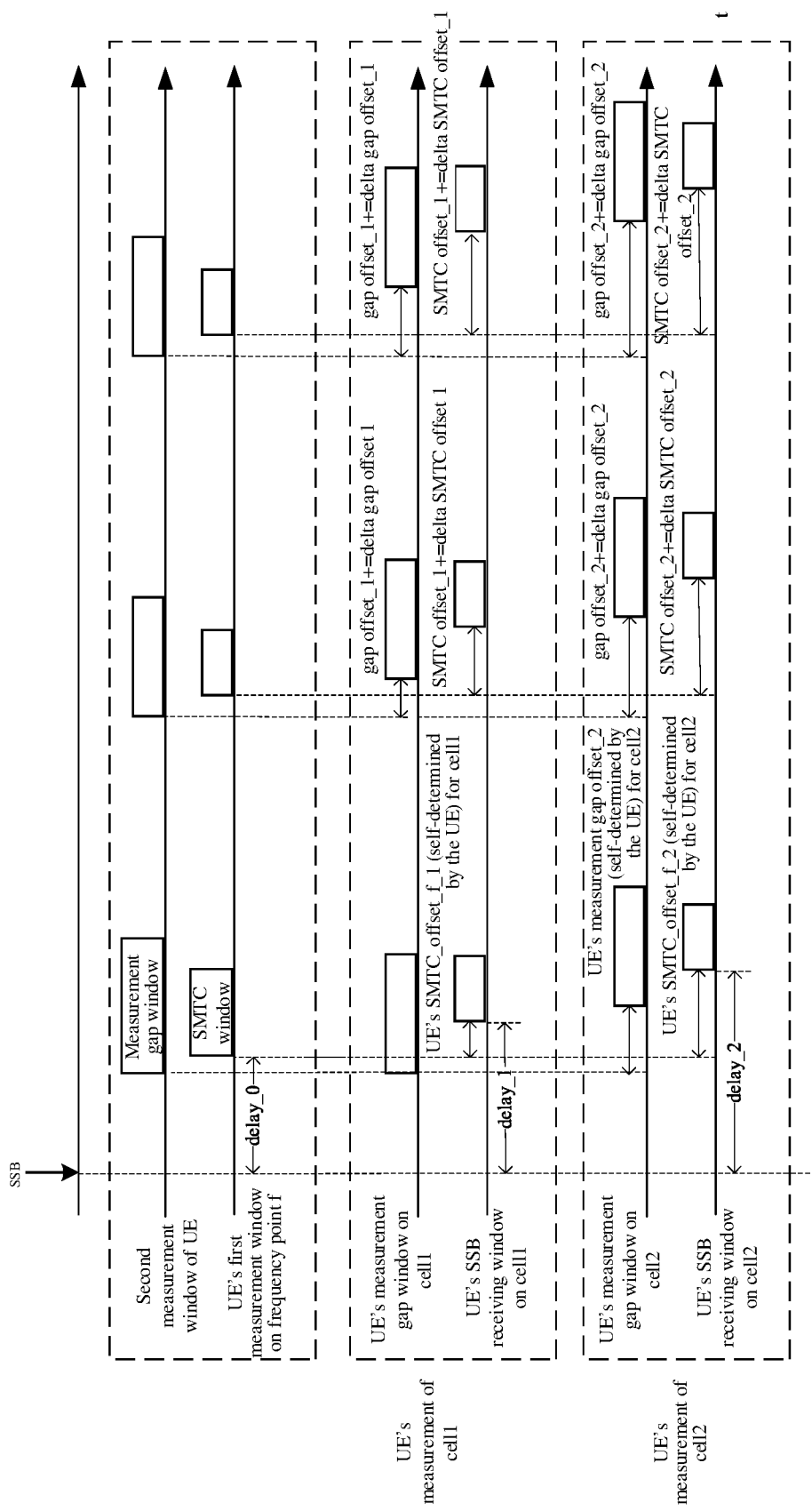
FIG. 7 is a schematic diagram of a measurement window according to another exemplary implementation of the present disclosure.

According to the first measurement configuration, the UE respectively determines the SSB receiving windows and the measurement gap windows in the neighboring cells cell1 and cell2, and at the same time periodically updates starting positions of the measurement SSB receiving windows and the measurement gap windows, as shown in the following FIG. 7.

With regard to the neighboring cells cell1 and cell2, the UE performs measurement on these two neighboring cells according to the determined SSB receiving windows and measurement gap windows.

It should be noted that, in another implementation, for the adjustment of the measurement gap windows and SMTC windows corresponding to the neighboring cells in the whitelist neighboring cell list by the UE, the network side device may also configure partial information, and the UE can determine an adjustment amount by itself according to the partial information configured by the network side device. For example, the network side device informs the UE of the signal transmission delay between the UE and the serving cell and the signal transmission delay between the UE and each neighboring cell. Then the UE determines its SSB receiving window in each neighboring cell, and measures a starting time offset of the measurement gap window based on delay information provided by the network side device, and adjusts the SSB receiving window and the measurement gap window on this basis.

Figure 8:
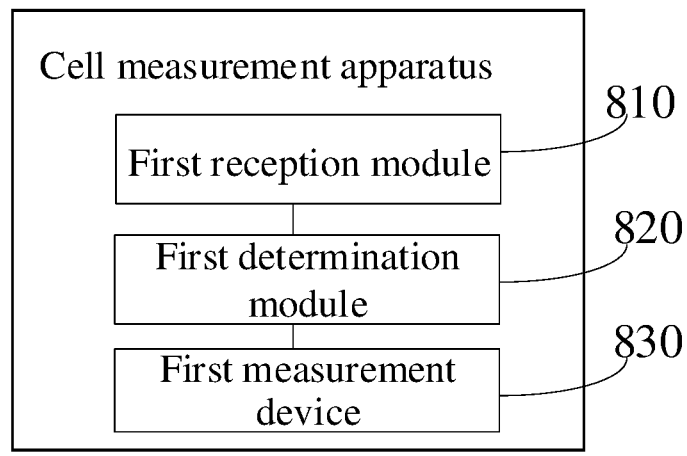
FIG. 8 is a schematic diagram of a structure of a cell measurement apparatus according to an exemplary implementation of the present disclosure.

Referring to FIG. 8, FIG. 8 is a schematic diagram of a structure of a cell measurement apparatus according to an exemplary implementation, which is applicable to a UE. The apparatus includes:

a first reception module 810, which is configured to receive a first measurement configuration, wherein the first measurement configuration includes a frequency point to be measured, first configuration information of a first measurement window corresponding to the frequency point to be measured, and a whitelist neighboring cell list, as well as a first starting time offset corresponding to a neighboring cell in the whitelist neighboring cell list;

a first determination module 820, which is configured to determine a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list; and a first measurement module 830, configured to measure each neighboring cell in the whitelist neighboring cell list based on the SSB receiving window corresponding to the neighboring cell in the whitelist neighboring cell list.

In a possible implementation of the present disclosure, first starting time offsets corresponding to neighboring cells in the whitelist neighboring cell list include the first starting time offset corresponding to each neighboring cell.

In a possible implementation of the present disclosure, the first starting time offset corresponding to each neighboring cell in the whitelist neighboring cell list is determined by network side device based on a satellite ephemeris, UE location information and a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and a current serving cell.

In a possible implementation of the present disclosure, when the first transmission delay corresponding to each neighboring cell is greater than the corresponding second transmission delay, the first starting time offset corresponding to each neighboring cell is greater than or equal to zero. Alternatively, when the first transmission delay corresponding to each neighboring cell is less than the corresponding second transmission delay, the first starting time offset corresponding to each neighboring cell is less than or equal to zero.

In a possible implementation of the present disclosure, the first configuration information includes a first window period, a first window starting offset, and first window duration, wherein the first window starting offset refers to a starting time offset of the first measurement window within one first window period; the first determination module 820 is configured to determine a sum of a first starting time offset corresponding to a target neighboring cell and the first window starting offset for the target neighboring cell, which is any neighboring cell in the whitelist neighboring cell list; perform modulo operation on the determined sum with the first window period, and determine an obtained numerical value as a starting time point of an SSB receiving window corresponding to the target neighboring cell; determine the first window period as a period of the SSB receiving window corresponding to the target neighboring cell, and determine the first window duration as duration of the SSB receiving window corresponding to the target neighboring cell.

In a possible implementation of the present disclosure, when a neighboring cell in the whitelist neighboring cell list and a current serving cell are of inter-frequency or inter-system, the first measurement configuration further includes second configuration information of a second measurement window and a second starting time offsets corresponding to the neighboring cell in the whitelist neighboring cell list.

In a possible implementation of the present disclosure, second starting time offsets corresponding to the neighboring cells in the whitelist neighboring cell list include the second starting time offset corresponding to each neighboring cell.

In a possible implementation of the present disclosure, the second starting time offset corresponding to each neighboring cell in the neighboring cells of the whitelist neighboring cell list is determined by the network side device based on a satellite ephemeris, UE location information and a difference between the first transmission delay and the second transmission delay corresponding to each neighboring cell, wherein the first transmission delay corresponding to each neighboring cell refers to the signal transmission delay between the neighboring cell and the UE, and the second transmission delay refers to a signal transmission delay between the UE and the current serving cell.

In a possible implementation of the present disclosure, when the first transmission delay corresponding to each neighboring cell is greater than the corresponding second transmission delay, the second starting time offset corresponding to each neighboring cell is greater than or equal to zero. Alternatively, when the first transmission delay corresponding to each neighboring cell is less than the corresponding second transmission delay, the second starting time offset corresponding to each neighboring cell is less than or equal to zero.

In a possible implementation of the present disclosure, the second configuration information includes a second window period, a second window starting offset and second window duration, wherein the second window starting offset is used to indicate a starting time offset of the second measurement window within one second window period. The first determination module 820 is further configured to determine a sum of a second starting time offset corresponding to a target neighboring cell and the second window starting offset for the target neighboring cell, which is any neighboring cell in the whitelist neighboring cell list; perform modulo operation on the determined sum with the second window period, and determine an obtained numerical value as a starting time point of a measurement gap window corresponding to the target neighboring cell; determine the second window period as a period of the measurement gap window corresponding to the target neighboring cell, and determine the second window duration as duration of the measurement gap window corresponding to the target neighboring cell.

In a possible implementation of the present disclosure, the first measurement module 830 is configured to measure each neighboring cell in the whitelist neighboring cell list based on the SSB receiving window and the measurement gap window corresponding to the neighboring cell in the whitelist neighboring cell list.

In a possible implementation of the present disclosure, first starting time offsets corresponding to the neighboring cells in the whitelist neighboring cell list include a first starting time offset corresponding to each group of neighboring cells, wherein a difference in signal transmission delays between different neighboring cells in each group of neighboring cells and the UE is within a reference threshold range.

In a possible implementation of the present disclosure, second starting time offsets corresponding to the neighboring cells in the whitelist neighboring cell list include the second starting time offset corresponding to each group of neighboring cells, wherein a difference in signal transmission delays between different neighboring cells in each group of neighboring cells and the UE is within a reference threshold range.

In a possible implementation of the present disclosure, the first measurement configuration further includes a first adjustment period and a first adjustment step of the first starting time offset corresponding to the neighboring cell in the whitelist neighboring cell list.

In a possible implementation of the present disclosure, the first adjustment period and the first adjustment step of the first starting time offset corresponding to the neighboring cell in the whitelist neighboring cell list are configured by the network side device according to movement rules of a satellite and the UE.

In a possible implementation of the present disclosure, the first measurement configuration further includes a second adjustment period and a second adjustment step of the second starting time offset corresponding to the neighboring cell in the whitelist neighboring cell list.

In a possible implementation of the present disclosure, the second adjustment period and the second adjustment step of the second starting time offset corresponding to the neighboring cell in the whitelist neighboring cell list are configured by the network side device according to the movement rules of the satellite and the UE.

In an implementation of the present disclosure, a first measurement configuration is received, wherein the first measurement configuration including not only a frequency point to be measured, first configuration information of a first measurement window corresponding to the frequency point to be measured, and a whitelist neighboring cell list, but also a first starting time offset corresponding to a neighboring cell in the whitelist neighboring cell list; that is, the first starting time offset is also configured for the neighboring cell in the whitelist neighboring cell list. In this way, a Synchronization Signal Block (SSB) receiving window corresponding to the neighboring cell in the whitelist neighboring cell list may be determined according to the first configuration information of the first measurement window corresponding to the frequency point to be measured and the first starting time offset corresponding to the neighboring cell in the whitelist neighboring cell list, so that each neighboring cell in the whitelist neighboring cell list is measured based on the SSB receiving window corresponding to the neighboring cell in the whitelist neighboring cell list. Therefore, different first measurement windows can be determined for different neighboring cells. This ensures that the UE can receive SSBs of neighboring cells in the first measurement window, avoids the problem that the UE needs to continuously perform detection due to the need of delaying t window durations, and thereby saving power consumption of the terminal.

Figure 9:
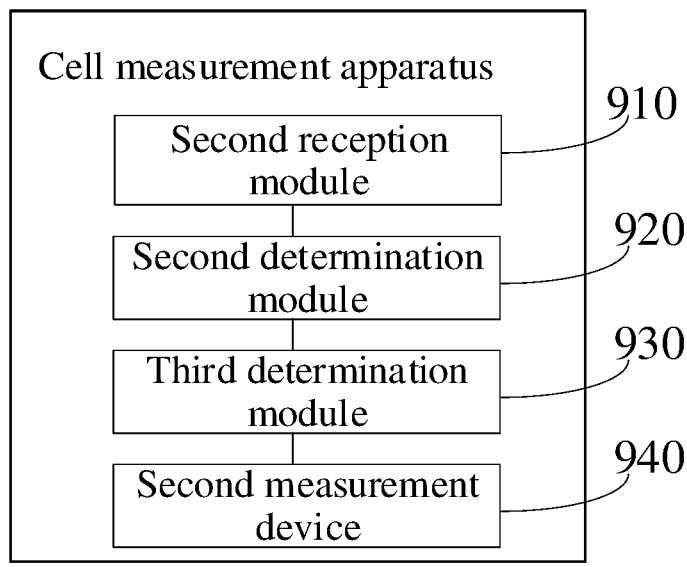
FIG. 9 is a schematic diagram of a structure of a cell measurement apparatus according to another exemplary implementation of the present disclosure.

Referring to FIG. 9, FIG. 9 is a schematic diagram of a structure of a cell measurement apparatus according to another exemplary implementation, which is applicable to a UE. The apparatus includes:

a second reception module 910 configured to receive a second measurement configuration including a frequency point to be measured, a whitelist neighboring cell list corresponding to the frequency point to be measured and first configuration information of a first measurement window;

a second determination module 920 configured to determine a first starting time offset corresponding to a neighboring cell in the whitelist neighboring cell list;

a third determination module 930 configured to determine a Synchronization Signal Block (SSB) receiving window corresponding to the neighboring cell in the whitelist neighboring cell list according to the first configuration information of the first measurement window corresponding to the frequency point to be measured and the first starting time offset corresponding to the neighboring cell in the whitelist neighboring cell list; and a second measurement module 940 configured to measure each neighboring cell in the whitelist neighboring cell list based on the SSB receiving window corresponding to the neighboring cell in the whitelist neighboring cell list.

In a possible implementation of the present disclosure, first starting time offsets corresponding to neighboring cells in the whitelist neighboring cell list include the first starting time offset corresponding to each neighboring cell.

In a possible implementation of the present disclosure, the second determination module 920 is configured to: determine a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and a current serving cell; and determine a first starting time offset corresponding to the neighboring cell in the whitelist neighboring cell list based on a satellite ephemeris, UE location information and the difference between the first transmission delay and the second transmission delay corresponding to each neighboring cell.

In a possible implementation of the present disclosure, when the first transmission delay corresponding to each neighboring cell is greater than the corresponding second transmission delay, the first starting time offset corresponding to each neighboring cell is greater than or equal to zero. Alternatively, when the first transmission delay corresponding to each neighboring cell is less than the corresponding second transmission delay, the first starting time offset corresponding to each neighboring cell is less than or equal to zero.

In a possible implementation of the present disclosure, the first configuration information includes a first window period, a first window starting offset, and first window duration, wherein the first window starting offset refers to a starting time offset of the first measurement window within one first window period;

Accordingly, the third determination module 930 is configured to:
  determine a sum of a first starting time offset corresponding to a target neighboring cell and the first window starting offset for the target neighboring cell, which is any neighboring cell in the whitelist neighboring cell list; perform modulo operation on the determined sum with the first window period, and determine an obtained numerical value as a starting time point of an SSB receiving window corresponding to the target neighboring cell; determining the first window period as a period of the SSB receiving window corresponding to the target neighboring cell, and determine the first window duration as duration of the SSB receiving window corresponding to the target neighboring cell.

In a possible implementation of the present disclosure, when the neighboring cell in the whitelist neighboring cell list and the current serving cell are of inter-frequency or inter-system, the second measurement configuration further includes second configuration information of a second measurement window.

In a possible implementation of the present disclosure, the second determination module 920 is further configured to: determine a second starting time offset corresponding to a neighboring cell in the whitelist neighboring cell list.

In a possible implementation of the present disclosure, second starting time offsets corresponding to neighboring cells in the whitelist neighboring cell list include the second starting time offset corresponding to each neighboring cell.

In a possible implementation of the present disclosure, the second determination module 920 is configured to: determine a difference between the first transmission delay and the second transmission delay corresponding to each neighboring cell, wherein the first transmission delay corresponding to each neighboring cell refers to a signal transmission delay between the neighboring cell and the UE, and the second transmission delay refers to a signal transmission delay between the UE and the current serving cell; and determine a second starting time offset corresponding to each neighboring cell in the whitelist neighboring cell list based on a satellite ephemeris, UE location information and the difference between the first transmission delay and the second transmission delay corresponding to each neighboring cell.

In a possible implementation of the present disclosure, when the first transmission delay corresponding to each neighboring cell is greater than the corresponding second transmission delay, the second starting time offset corresponding to each neighboring cell is greater than or equal to zero. Alternatively, when the first transmission delay corresponding to each neighboring cell is less than the corresponding second transmission delay, the second starting time offset corresponding to each neighboring cell is less than or equal to zero.

In a possible implementation of the present disclosure, the second configuration information includes a second window period, a second window starting offset and second window duration, wherein the second window starting offset is used to indicate the starting time offset of the second measurement window within one second window period.

The third determination module 930 is further configured to:
  determine a sum of a second starting time offset corresponding to a target neighboring cell and the second window starting offset for the target neighboring cell, which is any neighboring cell in the whitelist neighboring cell list;
  perform modulo operation on the determined sum with the second window period, and determine an obtained numerical value as a starting time point of a measurement gap window corresponding to the target neighboring cell;
  determine the second window period as a period of the measurement gap window corresponding to the target neighboring cell, and determine the second window duration as duration of the measurement gap window corresponding to the target neighboring cell.

In a possible implementation of the present disclosure, the second measurement module 920 is configured to measure each neighboring cell in the whitelist neighboring cell list based on the SSB receiving window and the measurement gap window corresponding to the neighboring cell in the whitelist neighboring cell list.

In a possible implementation of the present disclosure, first starting time offsets corresponding to neighboring cells in the whitelist neighboring cell list include a first starting time offset corresponding to each group of neighboring cells, wherein a difference in signal transmission delays between different neighboring cells in each group of neighboring cells and the UE is within a reference threshold range.

In a possible implementation of the present disclosure, second starting time offsets corresponding to the neighboring cells in the whitelist neighboring cell list include the second starting time offset corresponding to each group of neighboring cells, wherein a difference in signal transmission delays between different neighboring cells in each group of neighboring cells and the UE is within a reference threshold range.

In a possible implementation of the present disclosure, the second determination module 920 is further configured to:
  determine a first adjustment period and a first adjustment step of the first starting time offset corresponding to the neighboring cell in the whitelist neighboring cell list.

In a possible implementation of the present disclosure, the first adjustment period and the first adjustment step of the first starting time offset corresponding to neighboring cell in the whitelist neighboring cell list are configured according to movement rules of a satellite and the UE.

In a possible implementation of the present disclosure, the second determination module 920 is further configured to:
determine a second adjustment period and a second adjustment step of the second starting time offset corresponding to the neighboring cell in the whitelist neighboring cell list.

In a possible implementation of the present disclosure, the second adjustment period and the second adjustment step of the second starting time offset corresponding to the neighboring cell in the whitelist neighboring cell list are configured according to the movement rules of the satellite and the UE.

In the implementation of the present disclosure, when at least one of a neighboring cell and a serving cell belongs to a non-GEO scene, the first starting time offset corresponding to the neighboring cell in the whitelist neighboring cell list is configured with the first adjustment period and the first adjustment step, so that the SSB receiving window determined after adjustment according to the first adjustment period and the first adjustment step can adapt to the measurement of the changed neighboring cell.

Figure 10:
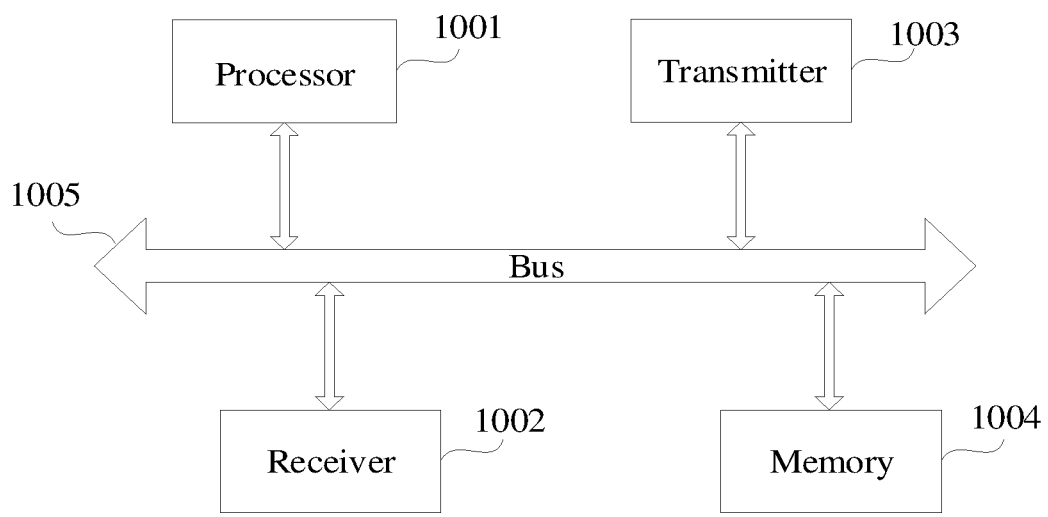
FIG. 10 is a schematic diagram of a structure of a device according to another exemplary implementation of the present disclosure.

Referring to FIG. 10, which is a schematic diagram of a structure of a device according to an exemplary implementation of the present disclosure. The equipment may be a UE, which is used to implement the methods described in the above implementations. The device includes a processor 1001, a receiver 1002, a transmitter 1003, a memory 1004 and a bus 1005.

The processor 1001 includes one or more processing cores. The processor 1001 performs various functional applications and information processing by running software programs and modules.

The receiver 1002 and the transmitter 1003 may be implemented as a communication assembly, which may be a communication chip.

The memory 1004 is connected to the processor 1001 via the bus 1005.

The memory 1004 may be configured to store at least one instruction, and the processor 1001 is configured to execute the at least one instruction to implement various acts executed by the terminal in the above various method implementations.

In addition, the memory 1004 may be implemented by any type of transitory or non-transitory storage device or a combination thereof. The transitory or non-transitory storage device includes, but is not limited to, a magnetic disk or an optical disk, an Electrically Erasable Programmable Read Only Memory (EEPROM), an Erasable Programmable Read Only Memory (EPROM), a Static Random Access Memory (SRAM), a Read Only Memory (ROM), a magnetic memory, a flash memory, and a Programmable Read Only Memory (PROM).

The present disclosure provides a computer-readable storage medium, storing at least one instruction which is loaded and executed by a processor to implement the methods according to the above various method implementations.

The present disclosure further provides a computer program product, which, when run on a computer, enables the computer to perform the methods according to the above various method implementations.

One of ordinary skills in the art may understand that all or part of the acts for implementing the implementations may be completed through hardware, or may be completed by instructing related hardware through programs, the programs may be stored in a computer-readable storage medium, the above-mentioned storage medium may be a read only memory, a magnetic disk, or an optical disk, etc.

The above description is only the preferred implementations of the present disclosure, and is not intended to limit the present disclosure. Any modification, equivalent substitution, improvement, etc., made within the spirit and principles of the present disclosure shall be included in the scope of protection of the present disclosure.

The invention claimed is:

1. A cell measurement method, applied to a User Equipment (UE), comprising:
receiving a first measurement configuration, wherein the first measurement configuration comprises a frequency point to be measured, first configuration information of a first measurement window corresponding to the frequency point to be measured, and a whitelist neighboring cell list, as well as a first starting time offset corresponding to a neighboring cell among a plurality of neighboring cells in the whitelist neighboring cell list;
determining a Synchronization Signal Block (SSB) receiving window corresponding to the neighboring cell in the whitelist neighboring cell list according to the first configuration information of the first measurement window corresponding to the frequency point to be measured and the first starting time offset; and
measuring each neighboring cell in the whitelist neighboring cell list based on an SSB receiving window corresponding to the neighboring cell in the whitelist neighboring cell list;
wherein the first starting time offset is based on at least one of a satellite ephemeris, UE location information, and a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and a current serving cell.

2. The method of claim 1, wherein
when the first transmission delay corresponding to each neighboring cell is greater than the second transmission delay, the first starting time offset is greater than or equal to zero; or, when the first transmission delay corresponding to each neighboring cell is less than the second transmission delay, the first starting time offset is less than or equal to zero.

3. The method of claim 1, wherein
the first configuration information comprises a first window period, a first window starting offset, and a first window duration, wherein the first window starting offset refers to a starting time offset of the first measurement window in one first window period;
the determining the Synchronization Signal Block (SSB) receiving window corresponding to the neighboring cell in the whitelist neighboring cell list according to the first configuration information of the first measurement window corresponding to the frequency point to be measured and the first starting time offset comprises:
for a target neighboring cell in the whitelist neighboring cell list, determining a sum of a first starting time offset corresponding to the target neighboring cell and the first window starting offset, wherein the target neighboring cell is any neighboring cell in the whitelist neighboring cell list;

performing modulo operation on the determined sum with the first window period to obtain a numerical value, and determining the obtained numerical value as a starting time point of an SSB receiving window corresponding to the target neighboring cell; and determining the first window period as a period of the SSB receiving window corresponding to the target neighboring cell, and determining the first window duration as a duration of the SSB receiving window corresponding to the target neighboring cell.

4. The method of claim 1, wherein when the neighboring cell in the whitelist neighboring cell list and a current serving cell are of inter-frequency or inter-system, the first measurement configuration further comprises second configuration information of a second measurement window and a second starting time offset corresponding to the neighboring cell in the whitelist neighboring cell list.

5. A cell measurement apparatus, applied to a User Equipment (UE), comprising: a processor and a receiver, wherein the receiver is configured to receive a first measurement configuration, wherein the first measurement configuration comprises a frequency point to be measured, first configuration information of a first measurement window corresponding to the frequency point to be measured, and a whitelist neighboring cell list, as well as a first starting time offset corresponding to a neighboring cell among a plurality of neighboring cells in the whitelist neighboring cell list;

the processor is configured to determine a Synchronization Signal Block (SSB) receiving window corresponding to the neighboring cell in the whitelist neighboring cell list according to the first configuration information of the first measurement window corresponding to the frequency point to be measured and the first starting time offset; and measure each neighboring cell in the whitelist neighboring cell list based on an SSB receiving window corresponding to the neighboring cell in the whitelist neighboring cell list;

wherein the first starting time offset is based on at least one of a satellite ephemeris, UE location information, and a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and a current serving cell.

6. The apparatus of claim 5, wherein when the first transmission delay corresponding to each neighboring cell is greater than the second transmission delay, the first starting time offset is greater than or equal to zero; or, when the first transmission delay corresponding to each neighboring cell is less than the second transmission delay, the first starting time offset is less than or equal to zero.

7. The apparatus of claim 5, wherein the first configuration information comprises a first window period, a first window starting offset, and a first window duration, wherein the first window starting offset refers to a starting time offset of the first measurement window in one first window period; and the processor is configured to:

for a target neighboring cell in the whitelist neighboring cell list, determine a sum of a first starting time offset corresponding to the target neighboring cell and the first window starting offset, wherein the target neighboring cell is any neighboring cell in the whitelist neighboring cell list;

perform modulo operation on the determined sum with the first window period to obtain a numerical value, and determining the obtained numerical value as a starting time point of an SSB receiving window corresponding to the target neighboring cell; and determine the first window period as a period of the SSB receiving window corresponding to the target neighboring cell, and determining the first window duration as a duration of the SSB receiving window corresponding to the target neighboring cell.

8. The apparatus of claim 5, wherein when the neighboring cell in the whitelist neighboring cell list and the current serving cell are of inter-frequency or inter-system, the first measurement configuration further comprises a second configuration information of a second measurement window and a second starting time offset corresponding to the neighboring cell in the whitelist neighboring cell list.

9. The apparatus of claim 8, wherein the second starting time offset is determined by a network side device based on a satellite ephemeris, UE location information and the difference between the first transmission delay and the second transmission delay corresponding to each neighboring cell, wherein when the first transmission delay corresponding to each neighboring cell is greater than the second transmission delay, the second starting time offset is greater than or equal to zero; or, when the first transmission delay corresponding to each neighboring cell is less than the second transmission delay, the second starting time offset is less than or equal to zero.

10. The apparatus of claim 8, wherein the second configuration information comprises a second window period, a second window starting offset and a second window duration, wherein the second window starting offset is used for indicating a starting time offset of the second measurement window in one second window period; and the processor is further configured to:

for a target neighboring cell in the whitelist neighboring cell list, determine a sum of a second starting time offset corresponding to the target neighboring cell and the second window starting offset, wherein the target neighboring cell is any neighboring cell in the whitelist neighboring cell list;

perform modulo operation on the determined sum with the second window period to obtain a numerical value, and determine the obtained numerical value as a starting time point of a measurement gap window corresponding to the target neighboring cell;

determine the second window period as a period of the measurement gap window corresponding to the target neighboring cell, and determine the second window duration as a duration of the measurement gap window corresponding to the target neighboring cell; and measure each neighboring cell in the whitelist neighboring cell list based on an SSB receiving window and a measurement gap window corresponding to the neighboring cell in the whitelist neighboring cell list.

11. The apparatus of claim 5, wherein a difference in signal transmission delays between different neighboring cells in each group of neighboring cells and the UE is within a reference threshold range,
wherein the first measurement configuration further comprises a first adjustment period and a first adjustment step of the first starting time offset,
wherein the first adjustment period and the first adjustment step of the first starting time offset are configured by a network side device according to movement rules of a satellite and the UE.

12. The apparatus of claim 8, wherein a difference in signal transmission delays between different neighboring cells in each group of neighboring cells and the UE is within a reference threshold range,
wherein the first measurement configuration further comprises a second adjustment period and a second adjustment step of the second starting time offset,
wherein the second adjustment period and the second adjustment step of the second starting time offset are configured by a network side device according to movement rules of a satellite and the UE.

13. A cell measurement apparatus, applied to a User Equipment (UE), comprising: a processor and a receiver,
the receiver is configured to receive a second measurement configuration, wherein the second measurement configuration comprises a frequency point to be measured, a whitelist neighboring cell list corresponding to the frequency point to be measured and first configuration information of a first measurement window;
the processor is configured to determine a first starting time offset corresponding to a neighboring cell among a plurality of neighboring cells in the whitelist neighboring cell list;
determine a Synchronization Signal Block (SSB) receiving window corresponding to the neighboring cell in the whitelist neighboring cell list according to the first configuration information of the first measurement window corresponding to the frequency point to be measured and the first starting time offset; and
measure each neighboring cell in the whitelist neighboring cell list based on an SSB receiving window corresponding to the neighboring cell in the whitelist neighboring cell list;
wherein the processor is configured to:
determine a difference between a first transmission delay and a second transmission delay corresponding to each neighboring cell, wherein the first transmission delay corresponding to each neighboring cell refers to a signal transmission delay between the neighboring cell and the UE, and the second transmission delay refers to a signal transmission delay between the UE and a current serving cell; and
based on at least one of a satellite ephemeris, UE location information, the difference between the first transmission delay and the second transmission delay corresponding to each neighboring cell, determine the first starting time offset.

14. The apparatus of claim 13,
wherein when the first transmission delay corresponding to each neighboring cell is greater than the second transmission delay, the first starting time offset is greater than or equal to zero; or, when the first transmission delay corresponding to each neighboring cell is less than the second transmission delay, the first starting time offset is less than or equal to zero.

15. The apparatus of claim 13, wherein
the first configuration information comprises a first window period, a first window starting offset, and a first window duration, wherein the first window starting offset refers to a starting time offset of the first measurement window in one first window period;
the processor is configured to:
for a target neighboring cell in the whitelist neighboring cell list, determine a sum of a first starting time offset corresponding to the target neighboring cell and the first window starting offset, wherein the target neighboring cell is any neighboring cell in the whitelist neighboring cell list;
perform modulo operation on the determined sum with the first window period to obtain a numerical value, and determining the obtained numerical value as a starting time point of an SSB receiving window corresponding to the target neighboring cell; and
determine the first window period as a period of the SSB receiving window corresponding to the target neighboring cell, and determine the first window duration as a duration of the SSB receiving window corresponding to the target neighboring cell.

16. The apparatus of claim 13, wherein when the neighboring cell in the whitelist neighboring cell list and a current serving cell are of inter-frequency or inter-system, the second measurement configuration further comprises a second configuration information of a second measurement window.

17. The apparatus of claim 16, wherein the processor is further configured to,
determine a second starting time offset corresponding to the neighboring cell in the whitelist neighboring cell list based on a satellite ephemeris, UE location information and the difference between the first transmission delay and the second transmission delay corresponding to each neighboring cell;
wherein when the first transmission delay corresponding to each neighboring cell is greater than the second transmission delay, the second starting time offset is greater than or equal to zero; or, when the first transmission delay corresponding to each neighboring cell is less than the second transmission delay, the second starting time offset is less than or equal to zero.

18. The apparatus of claim 16, wherein
the second configuration information comprises a second window period, a second window starting offset and a second window duration, wherein the second window starting offset is used for indicating a starting time offset of the second measurement window in one second window period; and
the processor is further configured to:
for a target neighboring cell in the whitelist neighboring cell list, determine a sum of a second starting time offset corresponding to the target neighboring cell and the second window starting offset, wherein the target neighboring cell is any neighboring cell in the whitelist neighboring cell list;
perform modulo operation on the determined sum with the second window period to obtain a numerical value, and determine the obtained numerical value as a starting time point of a measurement gap window corresponding to the target neighboring cell;
determine the second window period as a period of the measurement gap window corresponding to the target neighboring cell, and determine the second window duration as a duration of the measurement gap window corresponding to the target neighboring cell; and measure each neighboring cell in the whitelist neighboring cell list based on an SSB receiving window and a measurement gap window corresponding to the neighboring cell in the whitelist neighboring cell list.

19. The apparatus of claim 13, wherein a difference in signal transmission delays between different neighboring cells in each group of neighboring cells and the UE is within a reference threshold range,
   wherein the processor is further configured to: determine a first adjustment period and a first adjustment step of the first starting time offset,
   wherein the first adjustment period and the first adjustment step of the first starting time offset are configured according to movement rules of a satellite and the UE.

20. The apparatus of claim 16, wherein a difference in signal transmission delays between different neighboring cells in each group of neighboring cells and the UE is within a reference threshold range,
   wherein the processor is further configured to:
   determine a second adjustment period and a second adjustment step of a second starting time offset corresponding to the neighboring cell in the whitelist neighboring cell list,
   wherein the second adjustment period and the second adjustment step of the second starting time offset are configured according to movement rules of a satellite and the UE.

* * * * *